US009811294B2

(12) United States Patent
Ito et al.

(10) Patent No.: US 9,811,294 B2
(45) Date of Patent: Nov. 7, 2017

(54) RELAY DEVICE, IMAGE FORMING APPARATUS, RELAY METHOD, AND NON-TRANSITORY COMPUTER-READABLE RECORDING MEDIUM ENCODED WITH RELAY PROGRAM

(71) Applicant: Konica Minolta; Inc., Chiyoda-ku (JP)

(72) Inventors: Yasutaka Ito, Amagasaki (JP); Kazumi Sawayanagi, Itami (JP); Noriaki Asamoto, Kusatsu (JP); Masami Yamada, Sennan-gun (JP); Hisashi Uchida, Kuze-gun (JP); Shuji Yoneda, Osaka (JP); Kazuya Anezaki, Itami (JP); Akihiro Torigoshi, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/554,139

(22) Filed: Nov. 26, 2014

(65) Prior Publication Data

US 2015/0153980 A1 Jun. 4, 2015

(30) Foreign Application Priority Data

Dec. 4, 2013 (JP) .................................. 2013-250715

(51) Int. Cl.
*G06F 3/12* (2006.01)
*H04L 29/06* (2006.01)

(52) U.S. Cl.
CPC .......... *G06F 3/1236* (2013.01); *G06F 3/1222* (2013.01); *G06F 3/1286* (2013.01); *G06F 3/1287* (2013.01); *H04L 63/0281* (2013.01)

(58) Field of Classification Search
None
See application file for complete search history.

(56) References Cited

U.S. PATENT DOCUMENTS 5,754,310 A * 5/1998 Aoki .................. H04N 1/33323
358/405
5,854,886 A * 12/1998 MacMillan ........... G06F 3/1297
358/1.15
(Continued)

FOREIGN PATENT DOCUMENTS

JP 2005-301999 A 10/2005
JP 2011-156800 A 8/2011
(Continued)

OTHER PUBLICATIONS

Notice of Ground of Rejection issued in corresponding Japanese Patent Application No. 2013-250715, dated Sep. 29, 2015, with English translation; 9 pages.
(Continued)

*Primary Examiner* — Ted Barnes
(74) *Attorney, Agent, or Firm* — Buchanan Ingersoll & Rooney PC

(57) ABSTRACT

A relay device includes a first session establishing portion to establish a first communication session with a cloud server located outside a firewall, a second session establishing portion to establish a second communication session with a control target device located inside the firewall, a device information acquiring portion to acquire device information about the control target device, and a relay portion to relay a communication between the cloud server and the control target device. The relay portion includes an executability determining portion to determine whether the control target device can execute a process specified by a control command received from the cloud server, a suspending portion to suspend an output of the control command when the determination result is non-executable, and a proxy transmission portion operable, when the determination result becomes executable after the control command was put on
(Continued)

hold, to transmit the control command to the control target device.

24 Claims, 12 Drawing Sheets

(56) References Cited

U.S. PATENT DOCUMENTS

| | | | | |
|---|---|---|---|---|
| 6,809,833 B1* | 10/2004 | Blair | G06F 3/1244 | 358/1.15 |
| 8,189,225 B1* | 5/2012 | Lo | G06F 3/122 | 358/1.15 |
| 2003/0086122 A1* | 5/2003 | Parry | H04N 1/00127 | 358/402 |
| 2003/0142345 A1* | 7/2003 | Bunn | G06F 3/1204 | 358/1.15 |
| 2004/0148379 A1* | 7/2004 | Ogura | H04L 29/06 | 709/223 |
| 2005/0138065 A1* | 6/2005 | Ciriza | G06Q 10/10 | |
| 2005/0243804 A1* | 11/2005 | Watai | H04L 41/06 | 370/352 |
| 2007/0011262 A1* | 1/2007 | Kitani | H04L 63/02 | 709/213 |
| 2007/0147870 A1* | 6/2007 | Shindo | G03G 15/5012 | 399/82 |
| 2009/0040547 A1* | 2/2009 | Ferlitsch | G06F 3/1208 | 358/1.15 |
| 2009/0248842 A1* | 10/2009 | Hashimoto | H04L 41/0893 | 709/221 |
| 2009/0279136 A1* | 11/2009 | Kanno | G06F 3/121 | 358/1.15 |
| 2011/0191464 A1* | 8/2011 | Okabe | G06F 15/16 | 709/224 |
| 2011/0214133 A1* | 9/2011 | Lum | G06F 21/41 | 719/318 |
| 2012/0036570 A1* | 2/2012 | Wada | H04L 63/02 | 726/11 |
| 2012/0062946 A1* | 3/2012 | Kitagata | G06F 3/1204 | 358/1.15 |
| 2012/0092695 A1* | 4/2012 | Masuyama | G06F 3/121 | 358/1.14 |
| 2012/0222101 A1* | 8/2012 | Iwasaki | H04L 63/0823 | 726/7 |
| 2012/0257243 A1* | 10/2012 | Kai | G06F 21/10 | 358/1.14 |
| 2012/0293837 A1* | 11/2012 | Mori | H04N 1/00464 | 358/1.15 |
| 2013/0086638 A1* | 4/2013 | Itogawa | G06F 21/34 | 726/4 |
| 2013/0163016 A1* | 6/2013 | Maekawa | G06K 15/402 | 358/1.13 |
| 2014/0258468 A1* | 9/2014 | Ishino | H04L 67/10 | 709/219 |
| 2014/0268236 A1* | 9/2014 | Ohara | G06F 3/1224 | 358/1.15 |
| 2014/0282481 A1* | 9/2014 | Ohara | G06F 8/665 | 717/172 |
| 2014/0313532 A1* | 10/2014 | Nakamura | G06F 3/1259 | 358/1.13 |
| 2015/0055177 A1* | 2/2015 | Saito | G06F 3/1206 | 358/1.15 |
| 2015/0095651 A1* | 4/2015 | Kato | H04L 63/062 | 713/176 |
| 2015/0188724 A1* | 7/2015 | Kim | G06F 3/048 | 340/3.71 |

FOREIGN PATENT DOCUMENTS

| | | |
|---|---|---|
| JP | 2012-37944 A | 2/2012 |
| JP | 2012-63944 A | 3/2012 |
| JP | 2012-155619 A | 8/2012 |
| JP | 2013-025387 A | 2/2013 |

OTHER PUBLICATIONS

First Office Action issued in corresponding Chinese Patent Application No. 201410724771.5, dated Jun. 1, 2017, with English Translation (17 pages).

* cited by examiner

F I G. 7
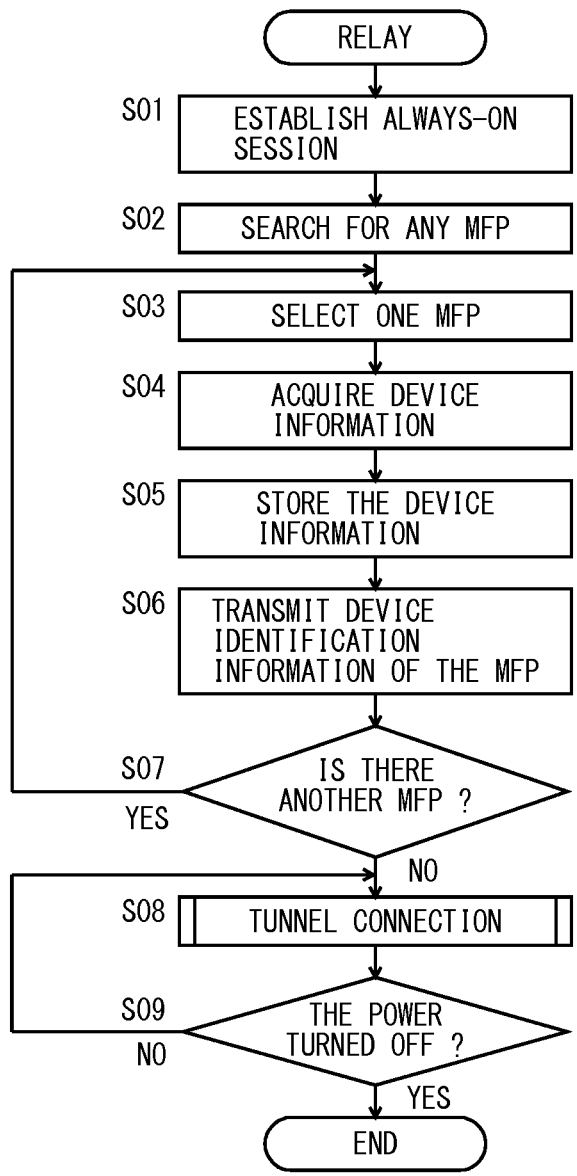

F I G. 1 1
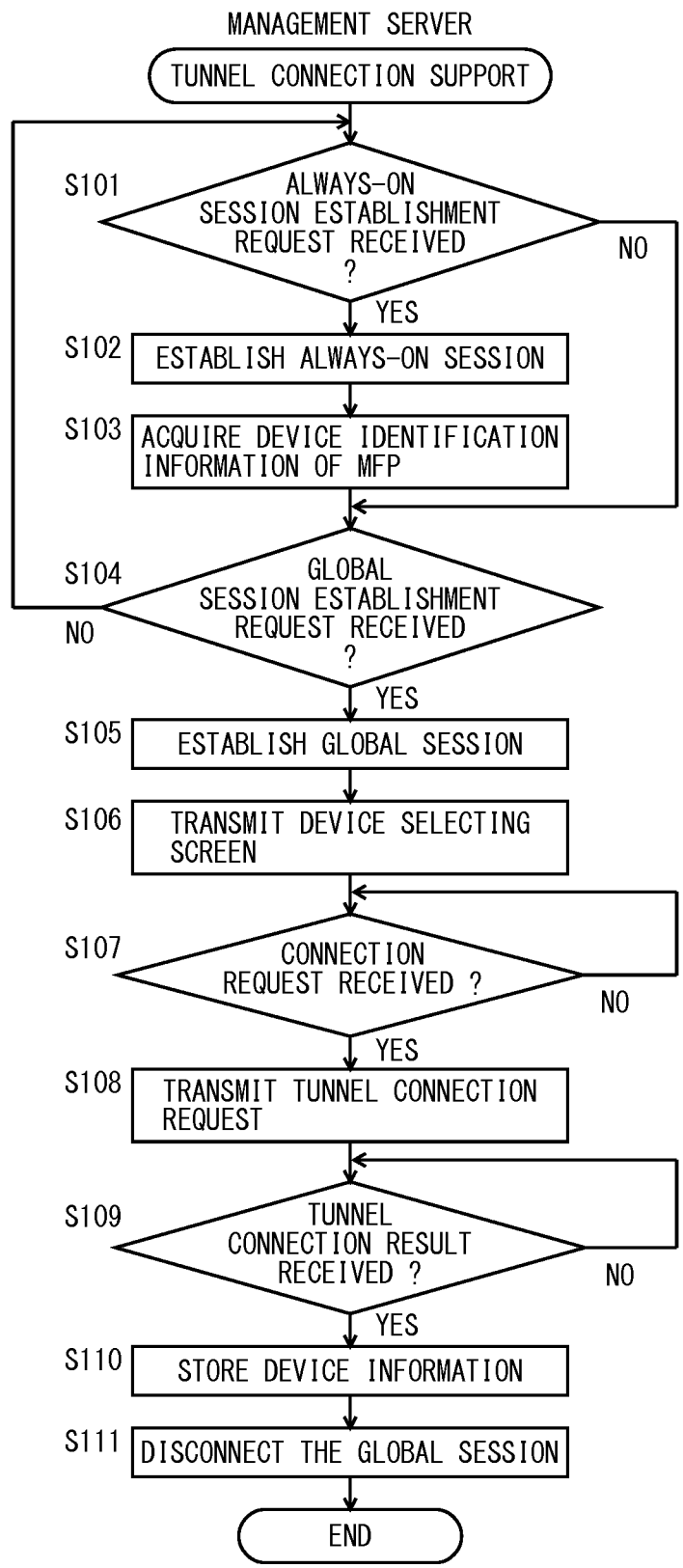

RELAY DEVICE, IMAGE FORMING APPARATUS, RELAY METHOD, AND NON-TRANSITORY COMPUTER-READABLE RECORDING MEDIUM ENCODED WITH RELAY PROGRAM

This application is based on Japanese Patent Application No. 2013-250715 filed with Japan Patent Office on Dec. 4, 2013, the entire content of which is hereby incorporated by reference.

BACKGROUND OF THE INVENTION

Field of the Invention

The present invention relates to a relay device, an image forming apparatus, a relay method, and a non-transitory computer-readable recording medium encoded with a relay program. More particularly, the present invention relates to a relay device which relays communications between a device located outside a firewall and a device located inside the firewall, an image forming apparatus which includes the relay device, a relay method which is executed by the relay device, and a non-transitory computer-readable recording medium encoded with a relay program which is executed by the relay device.

Description of the Related Art

A multi-function peripheral (hereinafter, referred to as "MFP") which is connected to a local area network (LAN) may be controlled by using a service provided from a cloud server which is connected to the Internet. For example, an MFP may be caused to print data stored in a cloud server. However, it is often the case that an MFP is connected to a LAN and the LAN is connected to the Internet via a firewall. Therefore, an access from the cloud server to the MFP may be blocked by the firewall.

Japanese Patent Laid-Open No. 2012-063944 discloses a print server which includes: a list request receiving unit which receives a printer list request from a client terminal; an acquisition unit which sends a status acquisition request to a printer and acquires the status indicating whether the printer is available for printing; and a sending unit which sends, to the client terminal that has sent the printer list request, data of a printer list described in a format for display on a Web browser of the client terminal, using the status of the printer that has been acquired by the acquisition unit. When the status of the printer cannot be acquired in the acquisition unit, the sending unit sends the data of the printer list by adding thereto a command which allows the Web browser of the client terminal to inquire the status of the printer whose status has not been acquired.

In the conventional printing system, however, the client terminal needs to be connected to a LAN to which the printer is connected. Further, the client terminal is caused to perform processing that should be performed by the print server. That is, the print server has to perform an additional process of generating a Web page for causing the client terminal to execute the processing, and the client terminal has to perform the processing that should be originally performed by the print server. This increases the load on both of the print server and the client terminal.

SUMMARY OF THE INVENTION

An aspect of the present invention provides a relay device disposed inside a firewall and connected to a control target device disposed inside the firewall, wherein the relay device includes: a first session establishing portion to establish a first communication session with a cloud server located outside the firewall; a second session establishing portion to establish a second communication session with the control target device; a device information acquiring portion to acquire device information about the control target device; and a relay portion to relay a communication between the cloud server and the control target device using the first and second communication sessions, wherein the relay portion includes an executability determining portion to determine whether the control target device is able to execute a process specified by a control command for the control target device received from the cloud server via the first communication session, on the basis of the device information acquired by the device information acquiring portion, a suspending portion operable, in response to reception of the control command from the cloud server, to suspend an output of the control command in the case where it is determined to be non-executable by the executability determining portion on the basis of the device information acquired by the device information acquiring portion, and a proxy transmission portion operable, in the case where it is determined to be executable by the executability determining portion on the basis of the device information acquired by the device information acquiring portion after the control command was put on hold by the suspending portion, to transmit the control command put on hold by the suspending portion to the control target device, on behalf of the cloud server, via the second communication session.

Another aspect of the present invention provides a relay method performed by a relay device disposed inside a firewall and connected to a control target device disposed inside the firewall, wherein the method includes: a first session establishing step of establishing a first communication session with a cloud server located outside the firewall; a second session establishing step of establishing a second communication session with the control target device; a device information acquiring step of acquiring device information about the control target device; and a relay step of relaying a communication between the cloud server and the control target device using the first and second communication sessions, wherein the relay step includes an executability determining step of determining whether the control target device is able to execute a process specified by a control command for the control target device received from the cloud server via the first communication session, on the basis of the device information acquired in the device information acquiring step, a suspending step of, in response to reception of the control command from the cloud server, suspending an output of the control command in the case where it is determined to be non-executable in the executability determining step on the basis of the device information acquired in the device information acquiring step, and a proxy transmitting step of, in the case where it is determined to be executable in the executability determining step on the basis of the device information acquired in the device information acquiring step after the control command was put on hold in the suspending step, transmitting the control command put on hold in the suspending step to the control target device, on behalf of the cloud server, via the second communication session.

A further aspect of the present invention provides a non-transitory computer-readable recording medium encoded with a relay program executed by a computer controlling a relay device, the relay device being disposed inside a firewall and connected to a control target device disposed inside the firewall, wherein the program causes the computer to perform: a first session establishing step of establishing a first communication session with a cloud server located outside the firewall; a second session establishing step of establishing a second communication session with the control target device; a device information acquiring step of acquiring device information about the control target device; and a relay step of relaying a communication between the cloud server and the control target device using the first and second communication sessions, wherein the relay step includes an executability determining step of determining whether the control target device is able to execute a process specified by a control command for the control target device received from the cloud server via the first communication session, on the basis of the device information acquired in the device information acquiring step, a suspending step of, in response to reception of the control command from the cloud server, suspending an output of the control command in the case where it is determined to be non-executable in the executability determining step on the basis of the device information acquired in the device information acquiring step, and a proxy transmitting step of, in the case where it is determined to be executable in the executability determining step on the basis of the device information acquired in the device information acquiring step after the control command was put on hold in the suspending step, transmitting the control command put on hold in the suspending step to the control target device, on behalf of the cloud server, via the second communication session.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 7 is a flowchart illustrating an exemplary flow of a relay process;

FIG. 11 is a flowchart illustrating an exemplary flow of a tunnel connection support process.

DESCRIPTION OF THE PREFERRED EMBODIMENTS

Figure 1:
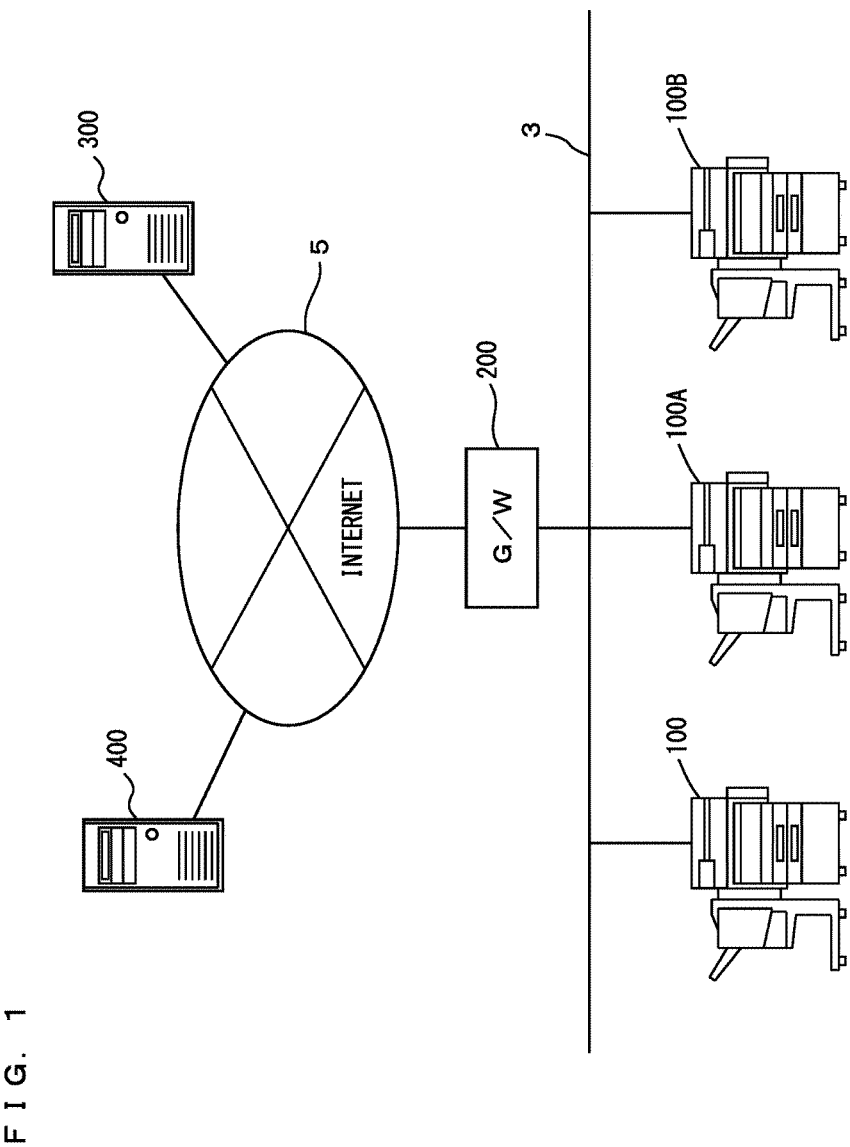
FIG. 1 schematically shows, by way of example, an information processing system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows, by way of example, an information processing system according to an embodiment of the present invention. Referring to FIG. 1, the information processing system includes a management server 300, a gateway (G/W) device 200 which functions as a relay device, and multi-function peripherals (MFPs) 100, 100A, and 100B. Management server 300 and gateway device 200 are each connected to the Internet 5, and they can communicate with each other via Internet 5. Further, management server 300 and gateway device 200 each can communicate with another computer which is connected to Internet 5. Here, a cloud server 400 is shown as an example of such another computer connected to Internet 5.

Further, gateway device 200 is connected to a local area network (LAN) 3, and MFPs 100, 100A, and 100B are also connected to LAN 3. Gateway device 200 can communicate with MFPs 100, 100A, and 100B connected to LAN 3. Further, gateway device 200 and MFPs 100, 100A, and 100B each can communicate with another computer which is connected to LAN 3.

Gateway device 200 has a firewall function, and connects LAN 3, which is located inside the firewall, with Internet 5, which is located outside the firewall. Gateway device 200 restricts accesses from management server 300 and cloud server 400, which are connected to Internet 5, to MFPs 100, 100A, and 100B, which are connected to LAN 3. The firewall function of gateway device 200 is not limited to a particular type, but it may be a packet filtering firewall function which determines whether to permit a communication or not on the basis of an address included in a packet. Alternatively, it may be an application-layer gateway firewall function which is a proxy that performs and controls a communication with the outside at an application layer protocol level. It should be noted that gateway device 200 is disposed inside the firewall.

In the information processing system according to the present embodiment, a computer connected to Internet 5 located outside the firewall, which is cloud server 400 here, is allowed to control any one of MFPs 100, 100A, and 100B, which are connected to LAN 3 located inside the firewall. In some cases, cloud server 400 is accessed from a personal computer (hereinafter, referred to as "PC") connected to LAN 3 inside the firewall and executes a process for providing a service in accordance with an instruction from the user who operates the PC. In other cases, cloud server 400 is accessed from a PC connected to Internet 5 outside the firewall and executes a process for providing a service in accordance with an instruction from the user who operates the PC. It is here assumed, by way of example, that cloud server 400 executes a process based on a service provided thereby and causes MFP 100 to execute a process on the resultant data. In this case, cloud server 400 transmits to MFP 100 a control command for causing MFP 100 to execute the process.

In order to allow a control command, transmitted from cloud server 400 to MFP 100, to pass through the firewall in gateway device 200, gateway device 200 establishes a tunnel connection between cloud server 400 and MFP 100. While there are a variety of techniques and methods for establishing a tunnel connection, it is here assumed that management server 300 supports the tunnel connection.

Gateway device 200 uses a network address of management server 300, which has been stored in advance, to request an establishment of a communication session between gateway device 200 and management server 300. As gateway device 200 is located inside the firewall and management server 300 is located outside the firewall, a communication session passing through the firewall is established. This communication session will be hereinafter referred to as an "always-on session".

When the always-on session is established between gateway device 200 and management server 300, gateway device 200 transmits device identification information for identifying each of MFPs 100, 100A, and 100B connected to LAN 3, to management server 300, via the always-on session. This allows management server 300 to recognize MFPs 100, 100A, and 100B connected to gateway device 200.

Next, a communication session is established between cloud server 400 and management server 300. Here, the communication session established between cloud server 400 and management server 300 will be referred to as a "global session". Management server 300 has received the device identification information of each of MFPs 100, 100A, and 100B from gateway device 200. Thus, management server 300 causes a user who is operating cloud server 400 to select one of MFPs 100, 100A, and 100B as a device with which a tunnel connection can be established. It is here assumed that the user who is operating cloud server 400 selects MFP 100 as the device with which the tunnel connection is to be established.

When the user who is operating cloud server 400 selects MFP 100 as the device with which the tunnel connection is to be established, cloud server 400 transmits a connection request including address information of MFP 100 and address information of cloud server 400, to management server 300. The address information of MFP 100 includes device identification information of gateway device 200 and device identification information of MFP 100. The address information of cloud server 400 is a uniform resource locator (URL) used by MFP 100 to access cloud server 400. In a URL, for example as in "https://www.example.com/print_service?job_id=j00123:60001", an address (domain name) of cloud server 400, a Web page identifier, an identifier (job ID) of the job executed by cloud server 400, and a listening port number are included. As the listening port, an unused one of the ports within a prescribed range is used. Further, a unique ID is issued as the job ID. The job executed by cloud server 400 is a job which corresponds to a service that the user who is operating cloud server 400 has designated from among the services provided by cloud server 400. Since the URL as the address information of cloud server 400 includes the job ID, it is possible to associate the device that has accessed the URL with the job that is specified by the job ID. In other words, it is possible to associate the job that corresponds to the service designated by the user who is operating cloud server 400, with the device that has requested the connection, which is MFP 100 here.

When management server 300 receives a connection request from cloud server 400, management server 300 specifies gateway device 200, on the basis of the device identification information of gateway device 200 included in the address information of MFP 100 included in the connection request, and transfers the connection request to gateway device 200, via the always-on session. In this case, the connection request is encapsulated, for transmission, in accordance with the protocol corresponding to the always-on session.

Further, when gateway device 200 receives the connection request from management server 300, gateway device 200 establishes a communication session with cloud server 400, on the basis of the address information of cloud server 400 included in the connection request. Here, the communication session established between gateway device 200 and cloud server 400 will be referred to as a "first communication session". This completes the tunnel connection passing through the firewall.

When gateway device 200 receives the connection request from management server 300, gateway device 200 specifies MFP 100, on the basis of the device identification information of MFP 100 included in the address information of MFP 100 included in the connection request, and establishes a communication session with MFP 100. Here, the communication session established between gateway device 200 and MFP 100 will be referred to as a "second communication session".

Gateway device 200 connects the first communication session, established between gateway device 200 and cloud server 400, and the second communication session, established between gateway device 200 and MFP 100, to thereby relay a communication between cloud server 400 and MFP 100.

It should be noted that the tunnel connection method is not limited to the above-described method; another method may be used as well. For example, management server 300 may relay a communication between cloud server 400 and MFP 100, as with gateway device 200. For example, gateway device 200 may establish always-on sessions with management server 300 for the respective MFPs 100, 100A, and 100B, and management server 300 may connect the global session, established between management server 300 and cloud server 400, with the always-on session corresponding to MFP 100 that has been designated by the user of cloud server 400, to thereby relay a communication between cloud server 400 and MFP 100. In this case, cloud server 400 only needs to transmit the address information of MFP 100; it does not have to transmit the address information of cloud server 400. The load on management server 300, however, increases because it executes the relay process.

The services provided by cloud server 400 include, for example, a program management service in which cloud server 400 performs version management and version upgrade of a program of MFP 100, a service in which cloud server 400 functions as a file server, and a service in which cloud server 400 performs image processing on image data. The image processing is not particularly restricted, but it may be a process of sharpening or smoothing photo image data, a process of performing character recognition on character image data, or a process of translating a language to another language.

Management server 300 and cloud server 400 are typical computers having well-known hardware configurations and functions, and therefore, a description thereof will not be provided here. MFPs 100, 100A, and 100B have common hardware configurations and functions, and therefore, unless otherwise specified, MFP 100 will be described representatively.

Figure 2:
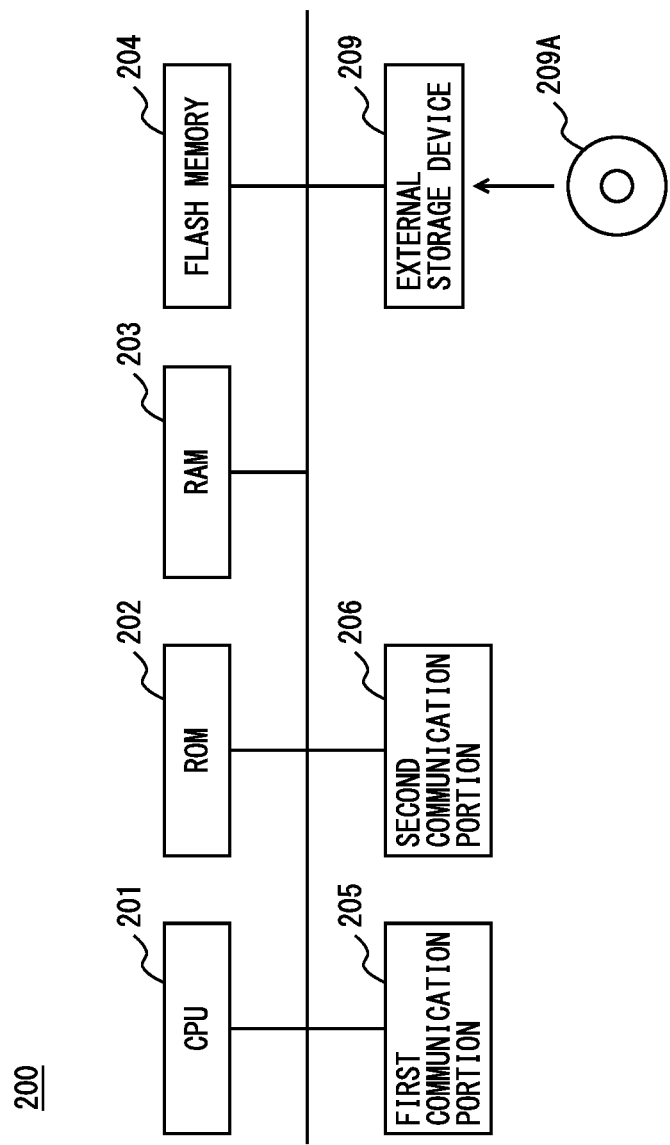
FIG. 2 is a block diagram schematically showing an exemplary hardware configuration of a gateway device.

FIG. 2 is a block diagram schematically showing an exemplary hardware configuration of a gateway device. Referring to FIG. 2, gateway device 200 according to the present embodiment includes: a central processing unit (CPU) 201 which is responsible for overall control of gateway device 200; a read only memory (ROM) 202 for storing, among others, a program to be executed by CPU 201; a random access memory (RAM) 203 used as a work area for CPU 201; a flash memory 204 which stores data in a non-volatile manner; a first communication portion 205; a second communication portion 206; and an external storage device 209.

First communication portion 205 is a communication interface (I/F) for connecting gateway device 200 to Internet 5. Second communication portion 206 is a communication interface (I/F) for connecting gateway device 200 to LAN 3.

Flash memory 204 stores a program executed by CPU 201 or data necessary for execution of the program. CPU 201 loads the program stored in flash memory 204, into RAM 203 for execution. External storage device 209 is detachably attached to gateway device 200, and it can be mounted with a compact disc ROM (CD-ROM) 209A in which a program is stored. CPU 201 is capable of accessing CD-ROM 209A via external storage device 209. CPU 201 can load a relay program, which is stored in CD-ROM 209A mounted on external storage device 209, into RAM 203 for execution.

While the program stored in flash memory 204 or CD-ROM 209A has been described as the program executed by CPU 201, another computer connected to Internet 5 may rewrite the program stored in flash memory 204, or may additionally write a new program therein. Further, gateway device 200 may download a program from another computer connected to Internet 5. As used herein, the "program" includes, not only the program which CPU 201 can execute directly, but also a source program, a compressed program, an encrypted program, and others.

It is noted that the medium for storing the program executed by CPU 201 is not restricted to CD-ROM 209A. It may be an optical disc (a magneto-optical (MO) disc, a mini disc (MD), or a digital versatile disc (DVD)), an IC card, an optical card, or a semiconductor memory such as a mask ROM, an erasable programmable ROM (EPROM), an electrically erasable and programmable ROM (EEPROM), or the like.

Figure 3:
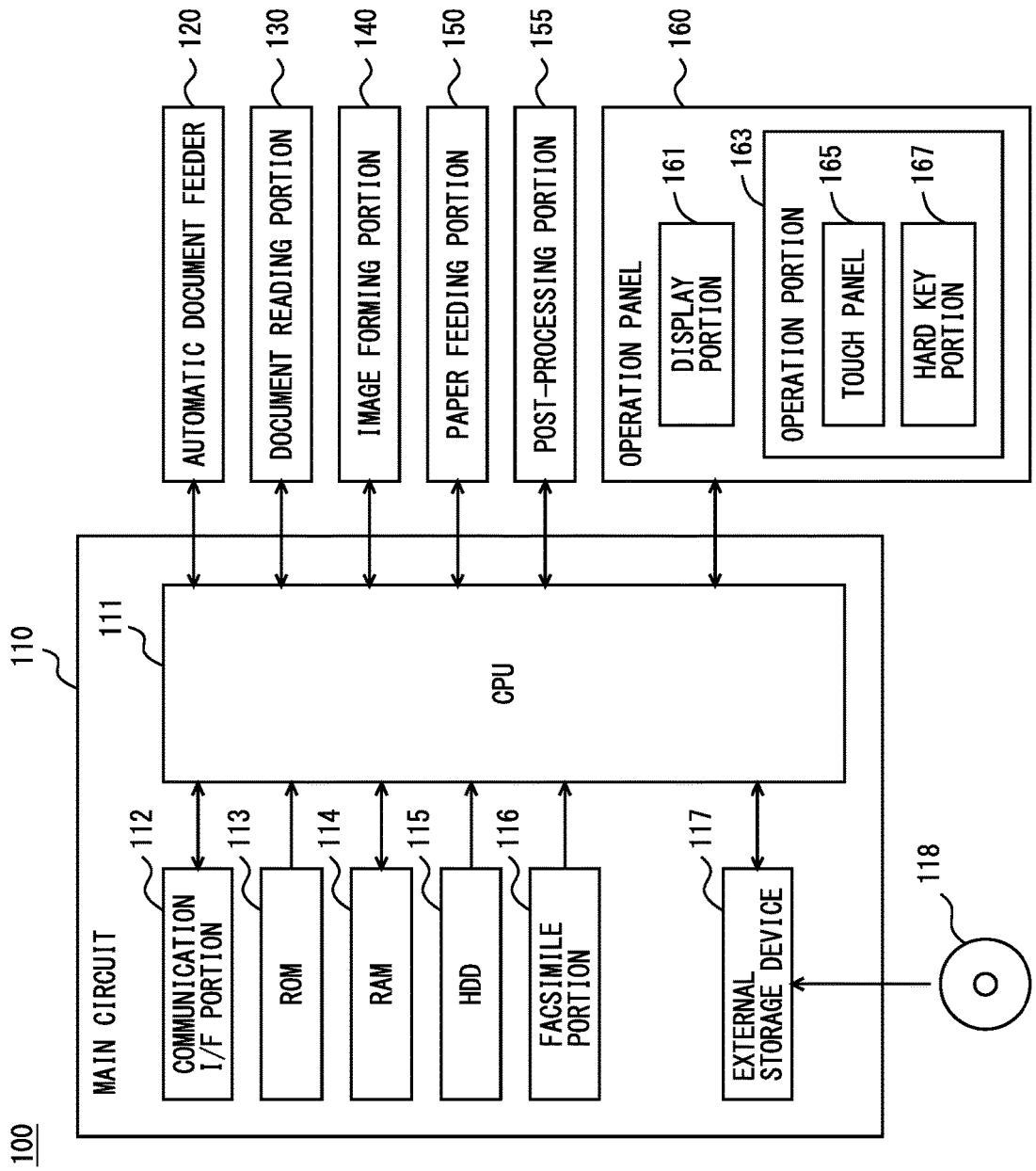
FIG. 3 is a block diagram schematically showing an exemplary hardware configuration of an MFP.

FIG. 3 is a block diagram schematically showing an exemplary hardware configuration of the MFP. Referring to FIG. 3, MFP 100 includes: a main circuit 110; a document reading portion 130 which reads a document; an automatic document feeder 120 which feeds a document to document reading portion 130; an image forming portion 140 which forms an image on a sheet of paper or the like on the basis of image data output from document reading portion 130 that has read a document; a paper feeding portion 150 which supplies sheets of paper to image forming portion 140; a post-processing portion 155 which processes sheets of paper on which images have been formed; and an operation panel 160 serving as a user interface.

Post-processing portion 155 performs a sorting process of sorting and discharging one or more sheets of paper on which images have been formed by image forming portion 140, a hole-punching process of punching the sheets, and a stapling process of stapling the sheets.

Main circuit 110 includes a CPU 111, a communication interface (I/F) portion 112, a ROM 113, a RAM 114, a hard disk drive (HDD) 115 as a mass storage, a facsimile portion 116, and an external storage device 117 on which a CD-ROM 118 is mounted. CPU 111 is connected with automatic document feeder 120, document reading portion 130, image forming portion 140, paper feeding portion 150, post-processing portion 155, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from document reading portion 130.

Operation panel 160, which is provided on an upper surface of MFP 100, includes a display portion 161 and an operation portion 163. Display portion 161 is a display such as a liquid crystal display (LCD) or an organic electroluminescence display (ELD), and displays an instruction menu for the user, information about acquired image data, and others. Operation portion 163 includes a hard key portion 167 having a plurality of keys, and accepts input data, such as instructions, characters, and numerical characters, according to the key operations by the user. Operation portion 163 further includes a touch panel 165 disposed on display portion 161.

Communication I/F portion 112 is an interface for connecting MFP 100 to LAN 3. CPU 111 communicates with a device which is connected to LAN 3, via communication I/F portion 112 for data transmission/reception. Further, communication I/F portion 112 is able to communicate with a computer connected to the Internet, such as cloud server 400, via gateway device 200.

Facsimile portion 116 is connected to public switched telephone networks (PSTN), and transmits facsimile data to or receives facsimile data from the PSTN. Facsimile portion 116 stores the received facsimile data into HDD 115, or outputs the data to image forming portion 140. Image forming portion 140 prints on a sheet of paper the facsimile data received by facsimile portion 116. Further, facsimile portion 116 converts the data stored in HDD 115 to facsimile data, and transmits the facsimile data to a facsimile machine connected to the PSTN.

External storage device 117 is mounted with CD-ROM 118. CPU 111 is capable of accessing CD-ROM 118 via external storage device 117. CPU 111 loads the program stored in CD-ROM 118 which is mounted on external storage device 117, into RAM 114 for execution. It is noted that the medium for storing the program executed by CPU 111 is not restricted to CD-ROM 118. It may be an optical disc (an MO disc, an MD, or a DVD), an IC card, an optical card, or a semiconductor memory such as a mask ROM, an EPROM, an EEPROM, or the like.

Further, CPU 111 may load a program stored in HDD 115, into RAM 114 for execution. In this case, another computer connected to LAN 3 or Internet 5 may rewrite the program stored in HDD 115 of MFP 100, or may additionally write a new program therein. Further, MFP 100 may download a program from another computer connected to LAN 3 or Internet 5, and store the program in HDD 115. As used herein, the "program" includes, not only the program which CPU 111 can execute directly, but also a source program, a compressed program, an encrypted program, and others.

Figure 4:
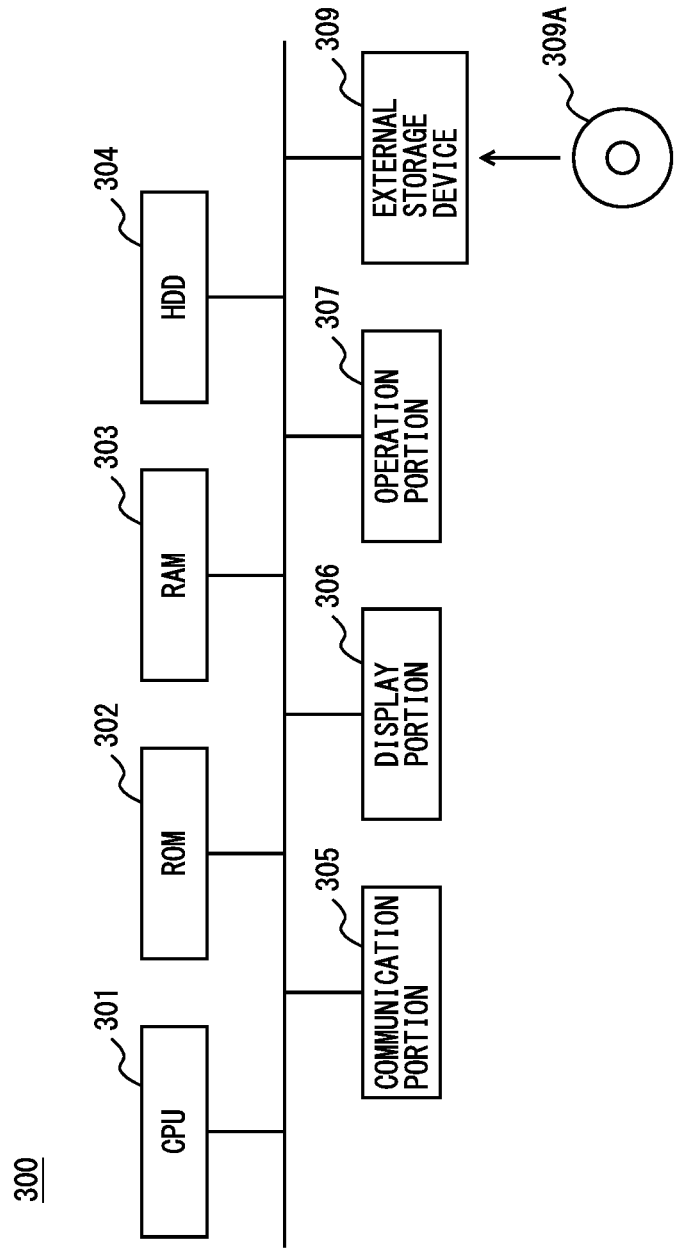
FIG. 4 is a block diagram schematically showing an exemplary hardware configuration of a management server according to the present embodiment.

FIG. 4 is a block diagram schematically showing an exemplary hardware configuration of a management server according to the present embodiment. Referring to FIG. 4, management server 300 includes: a CPU 301 which is responsible for overall control of management server 300; a ROM 302 for storing, among others, a program to be executed by CPU 301; a RAM 303 used as a work area for CPU 301; a HDD 304 which stores data in a non-volatile manner; a communication portion 305 which connects CPU 301 to Internet 5; a display portion 306 which displays information; an operation portion 307 which accepts operations by a user; and an external storage device 309.

External storage device 309 is mounted with a CD-ROM 309A. CPU 301 is capable of accessing CD-ROM 309A via external storage device 309. CPU 301 loads a program stored in CD-ROM 309A which is mounted on external storage device 309, into RAM 303 for execution. It is noted that the medium for storing the program executed by CPU 301 is not restricted to CD-ROM 309A. It may be an optical disc, an IC card, an optical card, or a semiconductor memory such as a mask ROM, an EPROM, an EEPROM, or the like.

Further, the program executed by CPU 301 is not restricted to the program stored in CD-ROM 309A; a program stored in HDD 304 may be loaded into RAM 303 for execution. In this case, another computer connected to Internet 5 may rewrite the program stored in HDD 304 of management server 300, or may additionally write a new program therein. Further, management server 300 may download a program from another computer connected to Internet 5, and store the program in HDD 304. As used herein, the "program" includes, not only the program which CPU 301 can execute directly, but also a source program, a compressed program, an encrypted program, and others.

Figure 5:
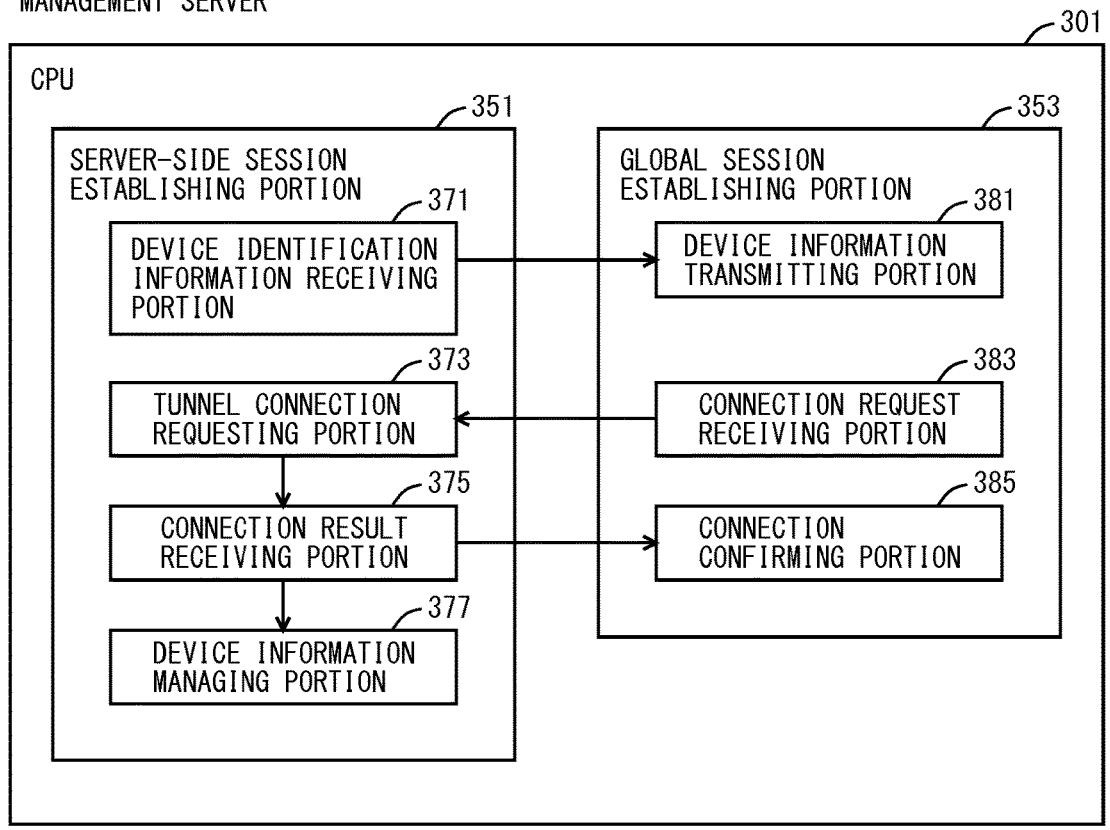
FIG. 5 is a block diagram showing, by way of example, the functions of a CPU included in the management server.

FIG. 5 is a block diagram showing, by way of example, the functions of a CPU included in the management server. The functions shown in FIG. 5 are formed in CPU 301 included in management server 300 as CPU 301 executes a program stored in ROM 302, HDD 304, or CD-ROM 309A. Referring to FIG. 5, CPU 301 included in management server 300 includes a server-side session establishing portion 351 and a global session establishing portion 353.

Server-side session establishing portion 351 controls communication portion 305 to establish a communication session with gateway device 200. The communication session established here is the always-on session. Server-side session establishing portion 351 establishes the communication session in response to reception of a communication session establishment request from gateway device 200. Server-side session establishing portion 351 includes: a device identification information receiving portion 371, a tunnel connection requesting portion 373, a connection result receiving portion 375, and a device information managing portion 377.

Device identification information receiving portion 371 receives device identification information from gateway device 200, via the always-on session established between management server 300 and gateway device 200, and outputs the received device identification information and the device identification information of gateway device 200, to global session establishing portion 353. While the functions of gateway device 200 will be described in detail later, briefly, when the always-on session is established between gateway device 200 and management server 300, gateway device 200 transmits device identification information of any device connected to LAN 3, i.e. the device identification information of each of MFPs 100, 100A, and 100B here. The device identification information of each of MFPs 100, 100A, and 100B may be, but not limited to, a local Internet protocol (IP) address assigned to the corresponding one of MFPs 100, 100A, and 100B in LAN 3. The device identification information of gateway device 200 may be, but not limited to, a global IP address assigned to gateway device 200 in Internet 5.

Global session establishing portion 353 controls communication portion 305 to establish a communication session with a computer located outside the firewall. Here, it is assumed that a communication session is established between management server 300 and cloud server 400. The communication session established here is the global session. Global session establishing portion 353 controls communication portion 305, and establishes the global session with cloud server 400 in response to reception of a communication session establishment request from cloud server 400. Global session establishing portion 353 includes a device information transmitting portion 381, a connection request receiving portion 383, and a connection confirming portion 385.

Device information transmitting portion 381 receives device identification information of gateway device 200 and device identification information of each of MFPs 100, 100A, and 100B from device identification information receiving portion 371. Device information transmitting portion 381 transmits the device identification information of gateway device 200 and the device identification information of each of MFPs 100, 100A, and 100B to cloud server 400 via the global session. For example, device information transmitting portion 381 transmits, to cloud server 400, a device selecting screen which includes the device identification information of gateway device 200 and the device identification information of each of MFPs 100, 100A, and 100B and on which gateway device 200 and one of MFPs 100, 100A, and 100B can be selected. Here, it is assumed that the device selecting screen is transmitted to cloud server 400 and then, in cloud server 400, a user who is operating cloud server 400 selects the device identification information of gateway device 200 and the device identification information of MFP 100. In this case, cloud server 400 transmits a connection request to management server 300 via the global session. A command to transmit a connection request may be embedded in the device selecting screen. For example, in the case where the device selecting screen is described in a markup language such as hypertext markup language (HTML) or extensible markup language (XML), the command to transmit a connection request may be embedded in the device selecting screen using a programming language such as Java (registered trademark) or JavaScript (registered trademark). This configuration makes it possible to cause cloud server 400 to perform a process of transmitting a connection request when the device identification information of MFP 100 is designated on the device selecting screen being displayed in cloud server 400.

The connection request includes address information of MFP 100 and address information of cloud server 400. The address information of MFP 100 includes device identification information of gateway device 200 and device identification information of MFP 100. The address information of cloud server 400 is a URL used by MFP 100 to access cloud server 400. The URL includes an address (domain name) of cloud server 400, a Web page identifier, an identifier (job ID) of the job executed by cloud server 400, and a listening port number.

Connection request receiving portion 383 receives a connection request that cloud server 400 transmits via the global session, and outputs the received connection request to server-side session establishing portion 351.

When a connection request is input from connection request receiving portion 383, tunnel connection requesting portion 373 transmits a tunnel connection request to gateway device 200 via the always-on session. The tunnel connection request is transmitted as a packet which has been encapsulated so as to conform to the protocol determined by the always-on session. On receipt of the tunnel connection request, gateway device 200 attempts to establish a communication session with MFP 100, and returns its result in the form of a tunnel connection result.

Connection result receiving portion 375 receives, via the always-on session, a tunnel connection result that gateway device 200 transmits. The tunnel connection result includes the device identification information, and also includes a mark indicating that the tunnel connection has succeeded or a mark indicating that the tunnel connection has failed. The tunnel connection may fail, for example, when MFP 100 has not been turned on, or when MFP 100 is unable to communicate because it is in trouble. Connection result receiving portion 375 outputs the tunnel connection result to global session establishing portion 353 and device information managing portion 377.

Device information managing portion 377 stores device status information for each of MFPs 100, 100A, and 100B, in HDD 304. The device status information is data in which the device identification information of each of MFPs 100, 100A, and 100B is associated with information on connection success/failure indicating that the tunnel connection has succeeded or failed. Device information managing portion 377 updates the device status information stored in HDD 304, in response to input of a tunnel connection result from connection result receiving portion 375. In the case where the tunnel connection result includes a mark indicating that the tunnel connection has succeeded, device information managing portion 377 extracts the device status information that includes the same device identification information as the one included in the tunnel connection result, from among the device status information stored in HDD 304, and updates the extracted device status information by updating the information on connection success/failure in the device status information with the mark indicating that the tunnel connection has succeeded. In the case where the tunnel connection result includes a mark indicating that the tunnel connection has failed, device information managing portion 377 extracts the device status information that includes the same device identification information as the one included in the tunnel connection result, from among the device status information stored in HDD 304, and updates the information on connection success/failure in the extracted device status information with the mark indicating that the tunnel connection has failed.

In the case where the tunnel connection result input from connection result receiving portion 375 includes a mark indicating that the tunnel connection has succeeded, connection confirming portion 395 in global session establishing portion 353 transmits a signal indicating that the connection has succeeded, to cloud server 400 via the global session. In cloud server 400, a message indicating that the connection has succeeded, for example, may be displayed to a user of cloud server 400, so as to notify the user that the connection has succeeded. In the case where the tunnel connection result input from connection result receiving portion 375 includes a mark indicating that the tunnel connection has failed, connection confirming portion 395 transmits an error signal indicating that the connection has failed, to cloud server 400 via the global session. In cloud server 400, a message indicating that the connection has failed, for example, may be displayed to a user of cloud server 400, so as to notify the user that the connection has failed.

Figure 6:
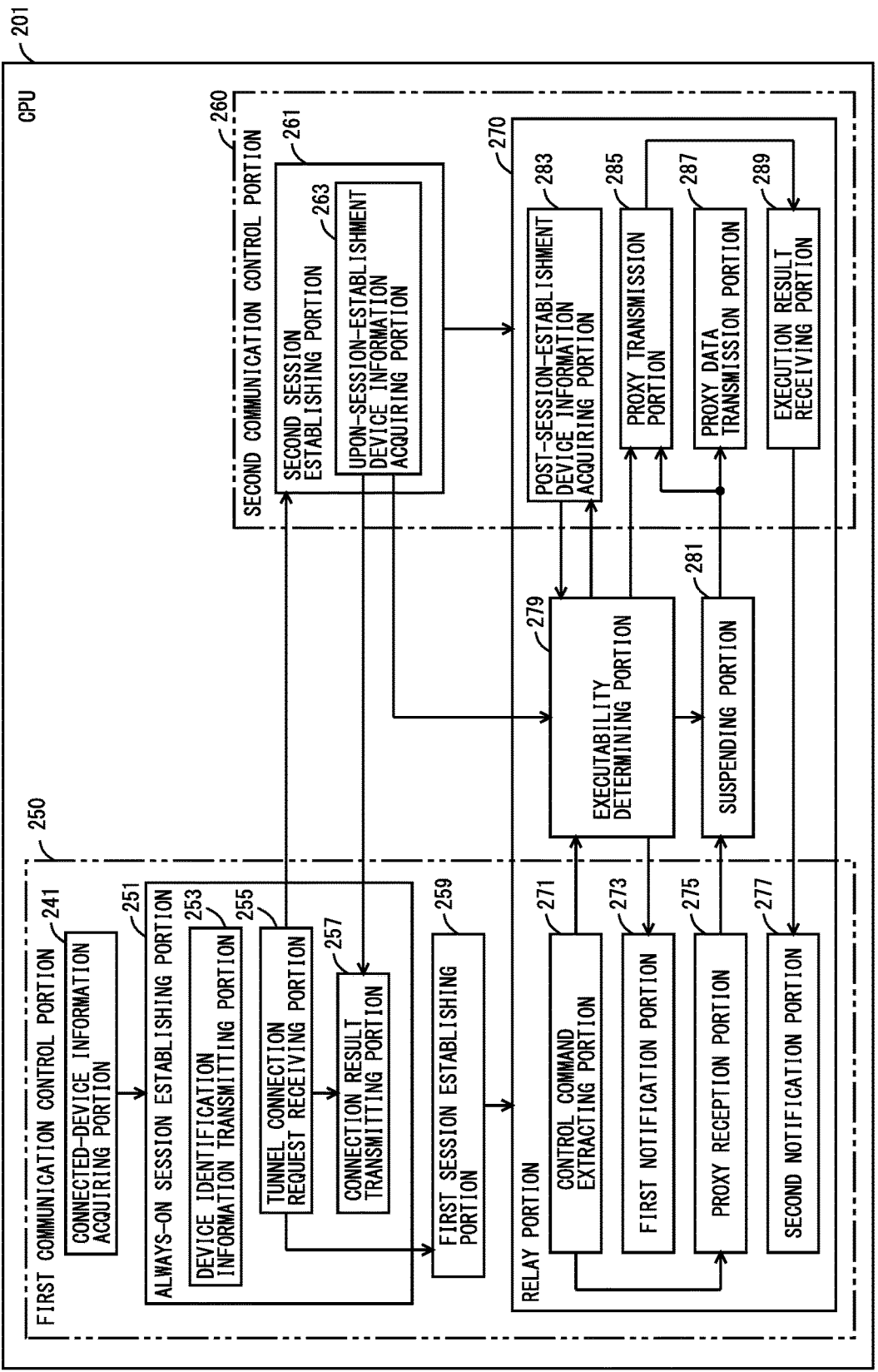
FIG. 6 is a block diagram showing, by way of example, the functions of a CPU included in the gateway device.

FIG. 6 is a block diagram showing, by way of example, the functions of a CPU included in the gateway device. The functions shown in FIG. 6 are formed in CPU 201 included in gateway device 200 as CPU 201 executes a relay program stored in ROM 202, flash memory 204, or CD-ROM 209A. Referring to FIG. 6, CPU 201 included in gateway device 200 includes: a connected-device information acquiring portion 241, an always-on session establishing portion 251, a first session establishing portion 259, a second session establishing portion 261, and a relay portion 270.

Relay portion 270 includes: a control command extracting portion 271, a first notification portion 273, a proxy reception portion 275, a second notification portion 277, an executability determining portion 279, a suspending portion 281, a post-session-establishment device information acquiring portion 283, a proxy transmission portion 285, a proxy data transmission portion 287, and an execution result receiving portion 289.

CPU 201 further includes a first communication control portion 250 and a second communication control portion 260. First communication control portion 250 controls first communication portion 205 so as to control a communication with a computer connected to Internet 5. First communication control portion 250 includes connected-device information acquiring portion 241, always-on session establishing portion 251, first session establishing portion 259, and also includes control command extracting portion 271, first notification portion 273, proxy reception portion 275, and second notification portion 277 included in relay portion 270.

Second communication control portion 260 controls second communication portion 206 so as to control a communication with each of MFPs 100, 100A, and 100B connected to LAN 3. Second communication control portion 260 includes second session establishing portion 261, and also includes post-session-establishment device information acquiring portion 283, proxy transmission portion 285, proxy data transmission portion 287, and execution result receiving portion 289 included in relay portion 270.

Connected-device information acquiring portion 241 acquires device identification information of any device that is connected to LAN 3 located inside the firewall. Connected-device information acquiring portion 241 searches for any device connected to LAN 3, at a prescribed timing, and acquires device identification information of the detected device. The prescribed timing may be determined arbitrarily; it may be, for example, the time when gateway device 200 has been turned on, or a predetermined time. Here, it is assumed that MFPs 100, 100A, and 100B are detected as the devices connected to LAN 3. Connected-device information acquiring portion 241 controls second communication portion 206 to acquire device identification information of each of MFPs 100, 100A, and 100B detected as the devices connected to LAN 3. The device identification information of each of MFPs 100, 100A, and 100B is a local IP address, for example. Connected-device information acquiring portion 241 outputs the acquired device identification information to always-on session establishing portion 251.

Always-on session establishing portion 251 receives the device identification information of each of MFPs 100, 100A, and 100B from connected-device information acquiring portion 241. Always-on session establishing portion 251 controls first communication portion 205 to transmit a communication session establishment request to management server 300, and establishes a communication session with management server 300. The communication session established here is the always-on session which is connected constantly. The always-on session is not particularly limited, but it may be, for example, a message session based on extensible messaging and presence protocol (XMPP). The global IP address of management server 300 has been stored in advance in flash memory 204. Always-on session establishing portion 251 uses the global IP address stored in flash memory 204 to transmit the communication session establishment request to management server 300, and performs prescribed negotiations with management server 300 to thereby establish the always-on session.

Always-on session establishing portion 251 includes a device identification information transmitting portion 253, a tunnel connection request receiving portion 255, and a connection result transmitting portion 257. Device identification information transmitting portion 253 transmits the device identification information of each of MFPs 100, 100A, and 100B, input from connected-device information acquiring portion 241, to management server 300 via the always-on session, so as to notify management server 300 of the devices connected to LAN 3 located inside the firewall.

Tunnel connection request receiving portion 255 controls first communication portion 205 to receive a tunnel connection request that management server 300 transmits. Tunnel connection request receiving portion 255 outputs a connection request which is included in the received tunnel connection request, to relay portion 270.

Tunnel connection request receiving portion 255 receives the tunnel connection request from management server 300 via the always-on session. The tunnel connection request includes the connection request that management server 300 has received from cloud server 400. The connection request includes the address information of MFP 100 and the address information of cloud server 400. The address information of MFP 100 includes the device identification information of gateway device 200 and the device identification information of MFP 100. The address information of cloud server 400 is a URL used by MFP 100 to access cloud server 400.

When tunnel connection request receiving portion 255 receives a tunnel connection request, tunnel connection request receiving portion 255 outputs the address information of cloud server 400, included in the connection request included in the tunnel connection request, to first session establishing portion 259, and outputs the address information of MFP 100, included in the connection request included in the tunnel connection request, to second session establishing portion 261. Tunnel connection request receiving portion 255 also outputs, to connection result transmitting portion 257, an instruction to transmit a connection result.

First session establishing portion 259 is operable, when the address information of cloud server 400 is input from tunnel connection request receiving portion 255, to control first communication portion 205 to establish a communication session with cloud server 400. The communication session established here is the first communication session. First session establishing portion 259 outputs session identification information for identifying the first communication session, to relay portion 270.

Second session establishing portion 261 is operable, when the address information of MFP 100 is input from tunnel connection request receiving portion 255, to control second communication portion 206 to transmit a communication session establishment request to MFP 100, and establishes a communication session with MFP 100. The communication session established here is the second communication session. The second communication session is not particularly limit; it only needs to be a communication session conforming to the communication protocol that is used in LAN 3. Second session establishing portion 261 outputs session identification information for identifying the second communication session, to relay portion 270.

Second session establishing portion 261 includes an upon-session-establishment device information acquiring portion 263. Upon-session-establishment device information acquiring portion 263 acquires device information of MFP 100 in response to establishment of a second communication session. Upon-session-establishment device information acquiring portion 263 outputs the acquired device information to executability determining portion 279 in relay portion 270. Upon-session-establishment device information acquiring portion 263 acquires device information from MFP 100 via the second communication session. The device information is information indicating the statuses of MFP 100, and it includes: information about a job being executed, its operating status, its error occurrence status, configuration of optional equipment, version information of a firmware program, version information of an application program, free space remaining in HDD 115, a counter value of printed copies, the number of queued jobs, and setting values.

In the case where a second communication session is established and upon-session-establishment device information acquiring portion 263 acquires the device information of MFP 100, upon-session-establishment device information acquiring portion 263 outputs, to connection result transmitting portion 257, a tunnel connection result that includes the device identification information of MFP 100 specified by the address information of MFP 100 included in the connection request, the device information, and a mark indicating that the tunnel connection has succeeded. In the case where the second communication session is not established, upon-session-establishment device information acquiring portion 263 outputs, to connection result transmitting portion 257, a tunnel connection result that includes the device identification information of MFP 100 specified by the address information of MFP 100 included in the connection request, and a mark indicating that the tunnel connection has failed. Second session establishing portion 261 fails to establish a second communication session when MFP 100 has not been turned on, or when there has occurred a trouble making MFP 100 unable to communicate.

In the case where connection result transmitting portion 257 receives an instruction to transmit a connection result from tunnel connection request receiving portion 255 and then receives a tunnel connection result from upon-session-establishment device information acquiring portion 263, connection result transmitting portion 257 transmits the tunnel connection result to management server 300 via the always-on session.

Relay portion 270 receives session identification information of the first communication session from first session establishing portion 259 and session identification information of the second communication session from second session establishing portion 261. Relay portion 270 uses the first communication session established by first session establishing portion 259 and the second communication session established by second session establishing portion 261 to relay a communication between cloud server 400 and MFP 100. Relaying the communication between cloud server 400 and MFP 100 by relay portion 270 enables data transmission/reception between cloud server 400 and MFP 100. Relay portion 270 associates the first communication session with the second communication session, and transmits data that is received from cloud server 400 via the first communication session, to MFP 100 via the second communication session, and also transmits data that is received from MFP 100 via the second communication session, to cloud server 400 via the first communication session.

Control command extracting portion 271 acquires a packet including a control command, from among the packets received from cloud server 400 via the first communication session. The control command is a command which is destined for MFP 100 from cloud server 400 so as to cause MFP 100 to execute a process. The control command specifies the process to be executed by MFP 100. When acquiring a packet that includes a control command, control command extracting portion 271 outputs the control command to executability determining portion 279 and proxy reception portion 275.

Executability determining portion 279 determines whether MFP 100 is able to execute the process specified by the control command input from control command extracting portion 271, on the basis of the device information of MFP 100 input from upon-session-establishment device information acquiring portion 263. When executability determining portion 279 determines that MFP 100 is able to execute the process specified by the control command, executability determining portion 279 outputs a proxy transmission instruction, including the control command, to proxy transmission portion 285. When determining that MFP 100 is unable to execute the process specified by the control command, executability determining portion 279 suspends the output of the control command to MFP 100. Specifically, executability determining portion 279 refrains from outputting a proxy transmission instruction including the control command to proxy transmission portion 285; instead, it outputs a first notification instruction to first notification portion 273 and also outputs a suspension instruction to suspending portion 281. The suspension instruction includes the control command.

When suspending portion 281 receives a suspension instruction from executability determining portion 279, suspending portion 281 temporarily stores the control command included in the suspension instruction. Suspending portion 281 stores the control command into flash memory 204, for example.

Further, in the case where executability determining portion 279 determines that MFP 100 is unable to execute the process specified by the control command, executability determining portion 279 outputs an acquisition instruction to post-session-establishment device information acquiring portion 283, at prescribed time intervals, until it is determined that MFP 100 is able to execute the process. Each time the acquisition instruction is input from executability determining portion 279, post-session-establishment device information acquiring portion 283 acquires the device information from MFP 100 via the second communication session, and outputs the acquired device information to executability determining portion 279. More specifically, in the case where executability determining portion 279 determines that MFP 100 is unable to execute the process specified by the control command on the basis of the device information acquired by upon-session-establishment device information acquiring portion 263, post-session-establishment device information acquiring portion 283 acquires the device information of MFP 100 at prescribed time intervals, and outputs the device information to executability determining portion 279. Each time the device information of MFP 100 is input from post-session-establishment device information acquiring portion 283, executability determining portion 279 determines whether MFP 100 is able to execute the process specified by the control command.

Executability determining portion 279 refers to an operating mode, included in the device information of MFP 100, and determines that MFP 100 is unable to execute the process specified by the control command if the operating mode of MFP 100 is a power saving mode. MFP 100 switches its operating mode between a normal mode and the power saving mode in which less power is consumed than in the normal mode. When MFP 100 is in the power saving mode, even if a control command is transmitted, MFP 100 will be unable to execute the process determined by the control command until the operating mode is switched to the normal mode.

The processes specified by the control commands include: a process of executing a job, a process of changing a setting value, and process of acquiring status information. When the control command specifies the process of executing a job, executability determining portion 279 determines whether the device information indicates that a process is being executed in MFP 100. If the device information indicates that no process is being executed in MFP 100, executability determining portion 279 determines that MFP 100 is able to execute the process specified by the control command input from control command extracting portion 271.

If the device information indicates that a process is being executed in MFP 100, executability determining portion 279 specifies, from the device information, the process that is being executed in MFP 100, and determines whether MFP 100 can execute the process being specified by the control command and the process being executed in MFP 100 in parallel. For example, in the case where the process specified by the control command is a process of storing data in HDD 115 and the process being executed in MFP 100 is a process of forming an image in image forming portion 140, it is determined that MFP 100 can execute the processes in parallel. In the case where the process specified by the control command is a process of storing data in HDD 115 and the process being executed in MFP 100 is a process of storing in HDD 155 a document read in document reading portion 130, it is determined that MFP 100 cannot execute the processes in parallel. When executability determining portion 279 determines that the process specified by the control command and the process being executed in MFP 100 can be executed in parallel, executability determining portion 279 determines that MFP 100 is able to execute the process specified by the control command. When executability determining portion 279 determines that the process specified by the control command and the process being executed in MFP 100 cannot be executed in parallel, executability determining portion 279 determines that MFP 100 is unable to execute the process specified by the control command.

It may be configured such that a table which defines two or more processes that can be executed in parallel and two or more processes that cannot be executed in parallel is acquired in advance from MFP 100 and stored in flash memory 204. Alternatively, it may be configured such that upon-session-establishment device information acquiring portion 263 acquires that table from MFP 100, as the device information that upon-session-establishment device information acquiring portion 263 acquires from MFP 100.

Executability determining portion 279 refers to the device information of MFP 100, and when the process specified by the control command is a data storing process of storing data, executability determining portion 279 determines whether HDD 115 has enough free space for storing the data. If HDD 115 has free space enough to store the data, executability determining portion 279 determines that MFP 100 is able to execute the process specified by the control command; otherwise, it determines that MFP 100 is unable to execute the process specified by the control command.

In the case where the control command specifies a process of changing a setting value, executability determining portion 279 determines whether the device information indicates that MFP 100 is being operated by another user. When the control command specifies the process of changing the setting value, if the device information indicates that MFP 100 is being operated by another user, executability determining portion 279 determines that MFP 100 is unable to execute the process specified by the control command; whereas if the device information indicates that MFP 100 is not being operated by another user, it determines that MFP 100 is able to execute the process specified by the control command. This is for preventing the setting value set by the other user from being changed without the other user knowing it.

In the case where the control command specifies a process of acquiring status information, executability determining portion 279 determines whether the device information indicates that a process is being executed in MFP 100. If the device information indicates that no process is being executed in MFP 100, executability determining portion 279 determines that MFP 100 is able to execute the process specified by the control command input from control command extracting portion 271. If the device information indicates that a process is being executed in MFP 100, executability determining portion 279 determines that MFP 100 is unable to execute the process specified by the control command input from control command extracting portion 271. This is because the status information may be changed as MFP 100 executes a job.

The status information includes: history information, maintenance information, and registration information. The history information includes the result of execution of a job by MFP 100. The history information includes, for example, image forming performance information indicating the result of execution of an image forming process of forming an image on a recording medium, facsimile transmission/reception performance information indicating the result of execution of a facsimile transmission/reception process of transmitting/receiving facsimile data, and scan performance information indicating the result of execution of a scan process of reading a document and outputting the image data. The image forming performance information includes user identification information of the user who has designated the job, image forming conditions, the number of printed copies, and the date and time when the job was executed. The facsimile transmission/reception performance information includes user identification information of the user who has designated the job, the number of destination or recipient of the facsimile, information on the transmitting/receiving status, and the date and time when the facsimile was transmitted or received. The scan performance information includes user identification information of the user who has designated the job, document reading conditions, the destination where the scanned data has been stored or transmitted, file name of the scanned data, and the date and time when the job was executed. The history information also includes error information which is stored when an error has occurred. The error information includes the date and time, the name of the job, the cause of the error, and so on.

The maintenance information includes consumables information, indicating the amount of usage of the consumables included in MFP 100, and replacement time information. The consumables information includes the remaining amount of the consumables. The consumables include, for example, paper, photoreceptor drum, toner, and transfer belt. The replacement time information indicates, for each of the consumables, the time of replacement which is calculated from the used amount. The unit of the replacement time is the number of times of execution of a process. For example, in the case of an image forming process, it is the number of sheets of paper on which images are formed. It should be noted that the unit of the replacement time may be a time period.

The registration information includes basic information registered in MFP 100. The basic information includes, for example, information about users who are permitted to use MFP 100, restriction information for restricting the executable jobs for each user, and address information indicating the destination of e-mail or facsimile.

When proxy reception portion 275 receives a control command from control command extracting portion 271, if the control command is a command to process data, proxy reception portion 275 acquires the data to be processed, which is received together with the control command via the first communication session. Proxy reception portion 275 outputs the acquired data to suspending portion 281.

When suspending portion 281 receives no suspension instruction from executability determining portion 279, suspending portion 281 outputs the data input from proxy reception portion 275, to proxy data transmission portion 287. When suspending portion 281 receives a suspension instruction, it temporarily stores the data input from proxy reception portion 275. Suspending portion 281 stores the data into flash memory 204, for example. Alternatively, suspending portion 281 may store the data into HDD 115 in either MFP 100A or 100B, other than MFP 100. Suspending portion 281 outputs positional information indicating where it has stored the data, to proxy data transmission portion 287.

Proxy transmission portion 285 is operable, when a proxy transmission instruction is input from executability determining portion 279, to transmit the control command included in the proxy transmission instruction to MFP 100, on behalf of cloud server 400, via the second communication session. At this time, proxy transmission portion 285 transmits information indicating that the control command has been transmitted from cloud server 400, by attaching the information to the control command.

In the case where the control command included in the proxy transmission instruction is a command to process data, proxy transmission portion 285 transmits the data input from suspending portion 281, to MFP 100 via the second communication session, together with the control command. When the data is temporarily stored by suspending portion 281, proxy transmission portion 285 requests an output of the data from suspending portion 281 to acquire the data, and transmits the data, together with the control command, to MFP 100 via the second communication session. When transmitting the control command to MFP 100, proxy transmission portion 285 outputs a signal indicating that it has transmitted the control command to MFP 100, to execution result receiving portion 289.

First notification portion 273 is operable, when a first notification instruction is input from executability determining portion 279, to transmit information indicating that MFP 100 cannot execute the process, to cloud server 400, on behalf of MFP 100, via the first communication session. The information indicating that MFP 100 cannot execute the process includes the information indicating that the transmission source is MFP 100.

Execution result receiving portion 289 receives, from proxy transmission portion 285, a signal indicating that it has transmitted the control command to MFP 100, and then receives an execution result from MFP 100 via the second communication session. Execution result receiving portion 289 outputs the received execution result to second notification portion 277.

Second notification portion 277 is operable, when an execution result is input from execution result receiving portion 289, to transmit the execution result to cloud server 400, on behalf of MFP 100, via the first communication session. The execution result includes the information indicating that the transmission source is MFP 100.

FIG. 7 is a flowchart illustrating an exemplary flow of a relay process. The relay process is performed by CPU 201 included in gateway device 200 as CPU 201 executes a relay program stored in ROM 202, flash memory 204, or CD-ROM 209A. Referring to FIG. 7, CPU 201 included in gateway device 200 controls first communication portion 205 to establish an always-on session with management server 300 (step S01). Specifically, CPU 201 uses the global IP address of management server 300 stored in flash memory 204 to transmit a communication session establishment request to management server 300, and performs prescribed negotiations with management server 300 to thereby establish the always-on session. The always-on session is not particularly limited, but it may be, for example, a message session based on XMPP.

In the following step S02, CPU 201 searches for any device connected to LAN 3 located inside the firewall. Specifically, CPU 201 broadcasts an inquiry over LAN 3, and acquires device identification information returned from each of MFPs 100, 100A, 100B, and thereby finds MFPs 100, 100A, and 100B. The device identification information may be, but not limited to, a local IP address assigned to each of MFPs 100, 100A, and 100B in LAN 3.

In the following step S03, CPU 201 selects one of MFPs 100, 100A, and 100B detected in step S02, as a process target. It is here assumed that MFP 100 is selected.

In step S04, CPU 201 acquires device information from MFP 100 selected as the process target. The device information is information indicating the statuses of MFP 100, and it includes: information about a job being executed, its operating status, its error occurrence status, configuration of optional equipment, version information of a firmware program, version information of an application program, free space remaining in HDD 115, a counter value of printed copies, the number of queued jobs, and setting values.

In step S05, CPU 201 stores the device information of MFP 100 into flash memory 204, and the process proceeds to step S06. In step S06, CPU 201 transmits device identification information detected in step S02 for MFP 100 being selected as the process target, to management server 300, via the always-on session established in step S01. This enables management server 300 to recognize MFP 100 connected to gateway device 200. The process then proceeds to step S07.

In step S07, CPU 201 determines whether there is any device not yet selected as a process target in step S03 among MFPs 100, 100A, and 100B detected in step S02. If there is a device yet to be selected, the process returns to step S03; otherwise, the process proceeds to step S08. In step S08, CPU 201 carries out a tunnel connection process (which will be described in detail below), and the process proceeds to step S09. In step S09, CPU 201 determines whether the power has been turned off. If so, the process is terminated; otherwise, the process returns to step S08.

Figure 8:
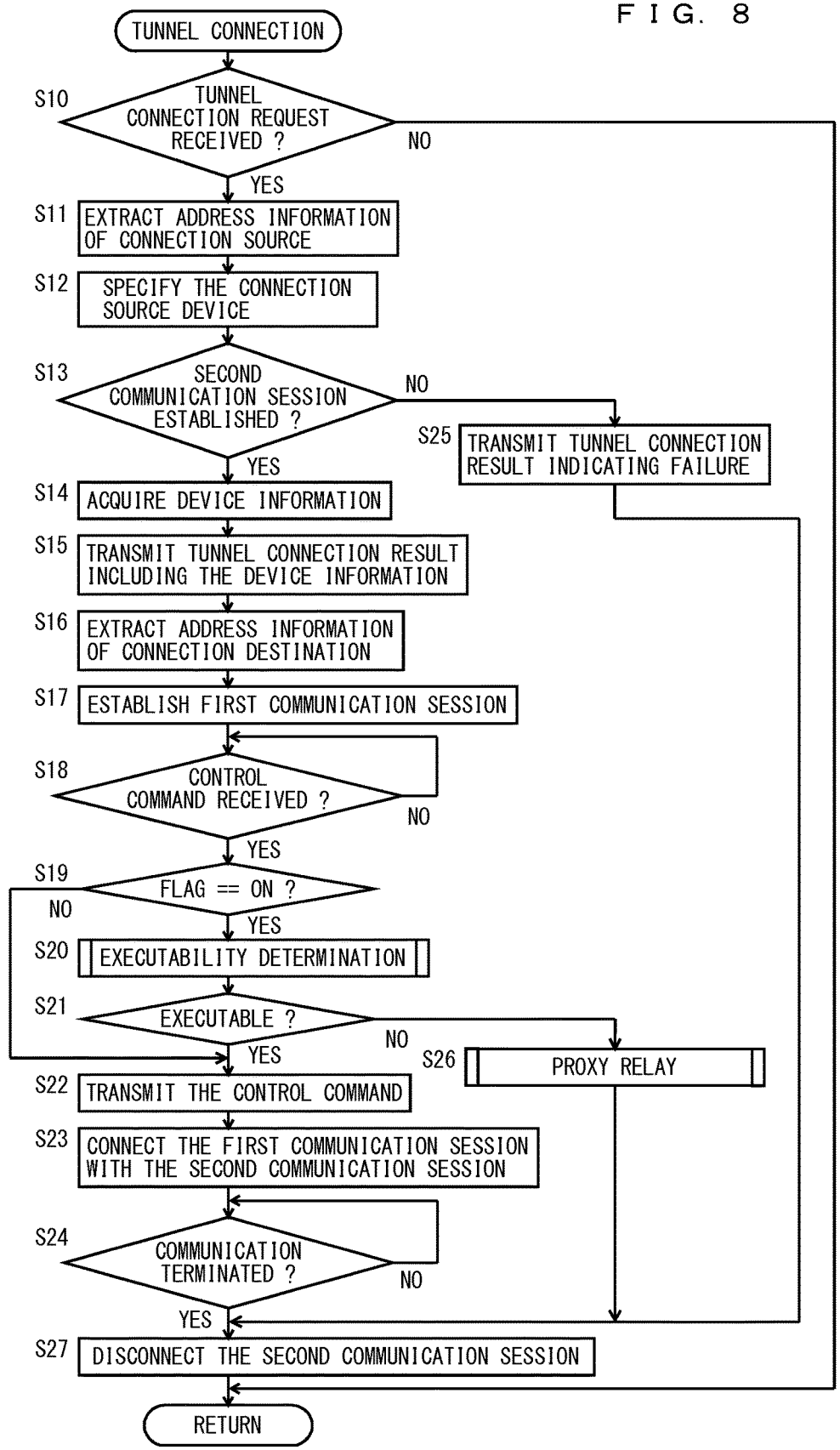
FIG. 8 is a flowchart illustrating an exemplary flow of a tunnel connection process.

FIG. 8 is a flowchart illustrating an exemplary flow of a tunnel connection process. The tunnel connection process is carried out in step S08 in FIG. 7. Referring to FIG. 8, in step S10, CPU 201 determines whether a tunnel connection request has been received from management server 300 via the always-on session. If so, the process proceeds to step S11; otherwise, the process returns to the relay process.

In step S11, CPU 201 extracts address information of a connection source, from the tunnel connection request. CPU 201 then specifies the connection source device on the basis of the address information of the connection source (step S12). Here, it is assumed that the tunnel connection request includes address information of MFP 100 as the address information of the connection source, and address information of cloud server 400 as the address information specifying the connection destination. In this case, MFP 100 is specified as the connection source device.

In the following step S13, CPU 201 controls second communication portion 206 to establish a second communication session with MFP 100 specified as the connection source device. Specifically, CPU 201 transmits a communication session establishment request to MFP 100 specified as the connection source device in step S12, attempting to establish the second communication session with MFP 100. If the second communication session is established, the process proceeds to step S14. If the second communication session cannot be established with MFP 100, the process proceeds to step S25. The second communication session cannot be established with MFP 100 for example when MFP 100 has not been turned on or when MFP 100 is unable to communicate because it is in trouble. In step S25, CPU 201 transmits a tunnel connection result including the device identification information of MFP 100, the device information, and a mark indicating that the tunnel connection has failed, to management server 300 via the always-on session, and the process proceeds to step S27.

In step S14, CPU 201 acquires device information from MFP 100 via the second communication session. In the following step S15, CPU 201 transmits a tunnel connection result including the device identification information of MFP 100, the device information, and a mark indicating that the tunnel connection has succeeded, to management server 300 via the always-on session. The process then proceeds to step S16.

In step S16, CPU 201 extracts the address information of the connection destination from the tunnel connection request received in step S10. Here, the tunnel connection request includes the address information of cloud server 400 as the address information specifying the connection destination. Thus, CPU 201 extracts the address information of cloud server 400. In the following step S17, CPU 201 controls first communication portion 205 to establish a first communication session with cloud server 400 by using the address information of the connection destination. Specifically, CPU 201 accesses the address specified by the address information of cloud server 400 extracted in step S16, to establish the first communication session with cloud server 400.

In step S18, CPU 201 determines whether a control command has been received. CPU 201 is in a standby mode until a control command is received (NO in step S18), and once the control command is received (YES in step S18), the process proceeds to step S19. Specifically, CPU 201 acquires a packet including a control command, from among the packets received from cloud server 400 via the first communication session. The control command is a command which is destined for MFP 100 from cloud server 400 so as to cause MFP 100 to execute a process. The control command specifies the process to be executed by MFP 100.

In step S19, CPU 201 determines whether a flag that is included in a message header of the packet including the control command has been set to ON. The flag has been set to ON or OFF in advance by cloud server 400. It may be set by default in cloud server 400, or may be set by a user who operates cloud server 400 using a client terminal. If the flag has been set to ON, the process proceeds to step S20; otherwise, the process proceeds to step S22.

In step S20, CPU 201 carries out an executability determination process, and the process proceeds to step S21. The executability determination process, which will be described in detail later, is a process of determining whether MFP 100 is able to execute the process that is determined by the control command received in step S18, on the basis of the device information acquired from MFP 100 in step S14. It should be noted that, if a prescribed time or more has passed from when the device information of MFP 100 was acquired in step S14 until when the step S20 is executed, the device information of MFP 100 may be acquired again and the executability determination process may be carried out on the basis of the newly acquired device information, for the following reason. There is a case where a prescribed time or more passes from when a tunnel connection request was received until when a control command is received, in which case the statuses of MFP 100 may change over the prescribed time.

In step S21, CPU 201 branches the process in accordance with the determination result in the executability determination process. If the result of the executability determination process is "executable" indicating that the process determined by the control command can be executed, the process proceeds to step S22; otherwise, the process proceeds to step S26. In step S26, CPU 201 carries out a proxy relay process, and the process proceeds to step S27. The proxy relay process will be described in detail later.

In step S22, CPU 201 transmits the control command to MFP 100, on behalf of cloud server 400, via the second communication session. At this time, information indicating that the control command was transmitted from cloud server 400 is transmitted appended to the control command. The process then proceeds to step S23.

In step S23, CPU 201 uses the first and second communication sessions to relay a communication between cloud server 400 and MFP 100. For example in the case where the control command is a command to process data, CPU 201 receives, via the first communication session, the data as a process target received together with the control command, and transmits the received data to MFP 100, on behalf of cloud server 400, via the second communication session. Further, in the case where an execution result is received from MFP 100 via the second communication session, CPU 201 transmits the execution result to cloud server 400, on behalf of MFP 100, via the first communication session. The execution result includes information indicating that it was transmitted from MFP 100.

In the following step S24, CPU 201 determines whether the communication has been terminated. For example, in the case where a communication end notification is received from cloud server 400 via the first communication session, CPU 201 determines that the communication has been terminated. CPU 201 is in a standby mode until it determines that the communication is terminated (NO in step S24), and once it determines that the communication is terminated (YES in step S24), the process proceeds to step S27. In step S27, CPU 201 disconnects the second communication session established in step S13, and the process returns to the relay process.

Figure 9:
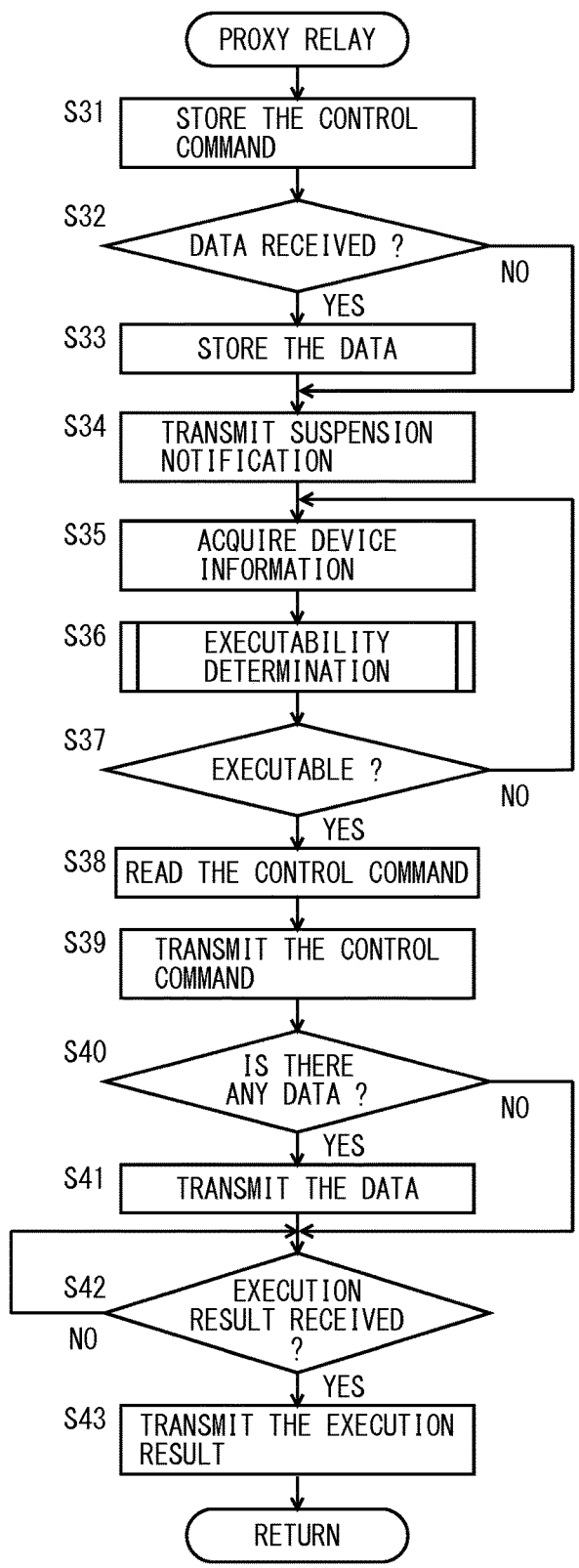
FIG. 9 is a flowchart illustrating an exemplary flow of a proxy relay process.

FIG. 9 is a flowchart illustrating an exemplary flow of a proxy relay process. The proxy relay process is carried out in step S26 of the tunnel connection process shown in FIG. 8, which is included in the relay process shown in FIG. 7. Before the proxy relay process is carried out, the control command has been received from cloud server 400. Referring to FIG. 9, CPU 201 temporarily stores the control command (step S31). For example, CPU 201 stores the control command in RAM 203. In the following step S32, CPU 201 determines whether data has been received from cloud server 400. CPU 201 acquires a packet including data as a target of the process determined by the control command, from among the packets received from cloud server 400 via the first communication session. If the data has been received, the process proceeds to step S33; otherwise, the process proceeds to step S34. In step S33, CPU 201 temporarily stores the data received from cloud server 400, and the process proceeds to step S34. For example, the data is stored in flash memory 204. Alternatively, the data may be transmitted to MFP 100A or 100B, other than MFP 100, and stored therein.

In step S34, CPU 201 transmits a suspension notification to cloud server 400, and the process proceeds to step S35. Specifically, CPU 201 transmits a message indicating that MFP 100 cannot execute the process, to cloud server 400, on behalf of MFP 100, via the first communication session. The suspension notification includes information indicating that the transmission source is MFP 100.

In the following step S35, CPU 201 acquires device information from MFP 100, and the process proceeds to step S36. Specifically, CPU 201 acquires the device information from MFP 100 via the second communication session established between gateway device 200 and MFP 100. In step S36, CPU 201 carries out an executability determination process, and the process proceeds to step S37. The executability determination process carried out in step S36, which will be described in detail later, is a process of determining whether MFP 100 is able to execute the process determined by the control command stored in step S31, on the basis of the device information acquired from MFP 100 in step S35.

In step S37, if the determination result in the executability determination process in step S36 is "executable" indicating that the process determined by the control command can be executed, the process proceeds to step S38; otherwise, the process returns to step S35. In step S38, CPU 201 reads the control command stored in RAM 203 in step S31. CPU 201 then transmits the read control command to MFP 100, on behalf of cloud server 400, via the second communication session (step S39). At this time, information indicating that the control command was transmitted from cloud server 400 is transmitted appended to the control command. The process then proceeds to step S40.

In step S40, CPU 201 determines whether there is data received from cloud server 400. Specifically, CPU 201 determines whether the above-described step S33 was executed and the data has been stored in flash memory 204 or MFP 100A or 100B. If there is the data received from cloud server 400, the process proceeds to step S41; otherwise, the process proceeds to step S42. In step S41, CPU 201 transmits the data stored in flash memory 204 or MFP 100A or 100B, to MFP 100, on behalf of cloud server 400, via the second communication session. The process then proceeds to step S42.

In step S42, CPU 201 determines whether an execution result has been received from MFP 100 via the second communication session. CPU 201 is in a standby mode until an execution result is received, and once the execution result is received, the process proceeds to step S43. In step S43, CPU 201 transmits the execution result received from MFP 100, to cloud server 400, on behalf of MFP 100, via the first communication session. The execution result includes information indicating that its transmission source is MFP 100. The process then returns to the relay process.

Figure 10:
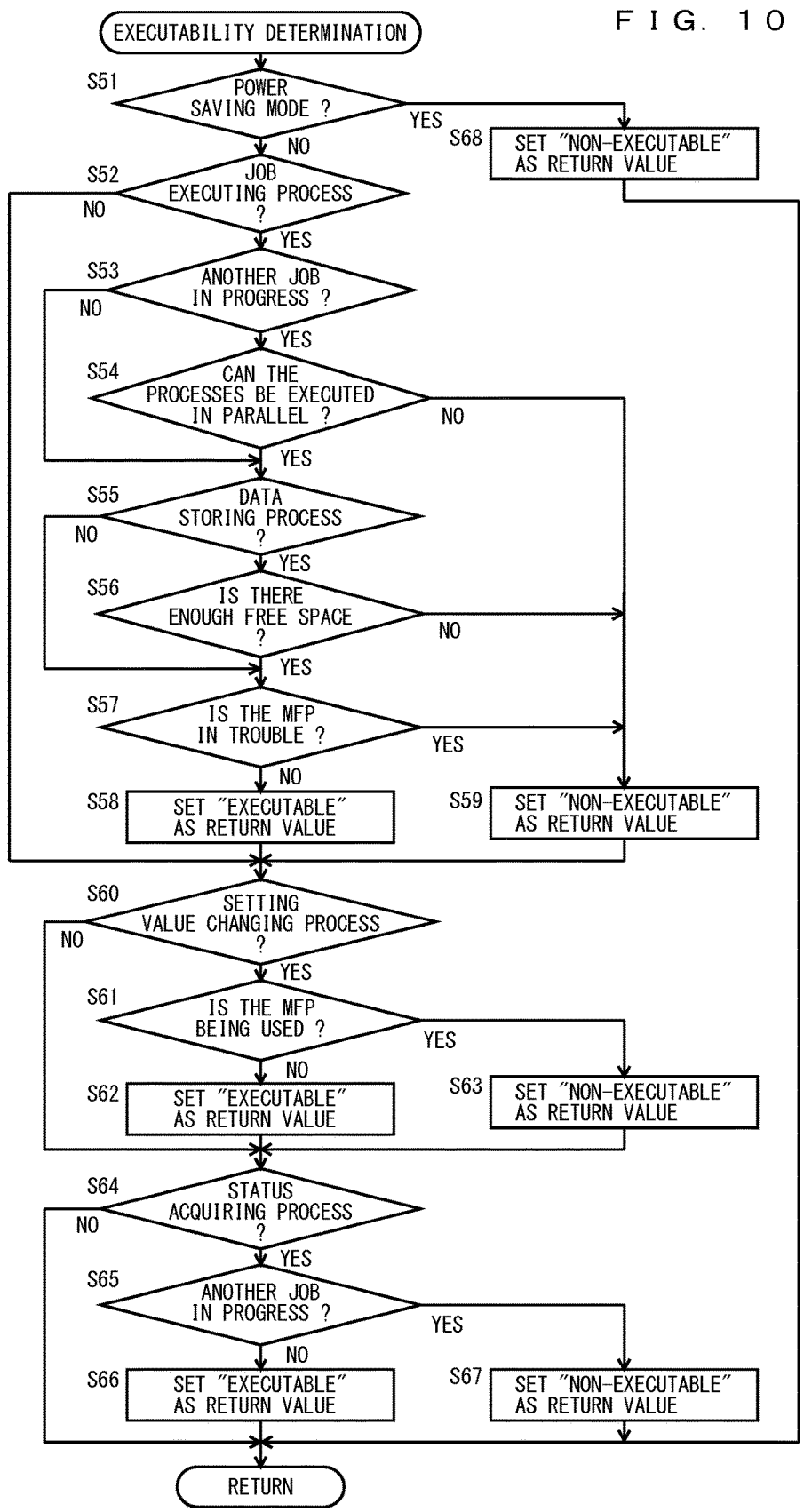
FIG. 10 is a flowchart illustrating an exemplary flow of an executability determination process.

FIG. 10 is a flowchart illustrating an exemplary flow of an executability determination process. The executability determination process is carried out in step S20 of the tunnel connection process shown in FIG. 8, and in step S36 of the proxy relay process shown in FIG. 9, both included in the relay process shown in FIG. 7. Before the executability determination process is carried out, the control command and the device information have been acquired.

Referring to FIG. 10, CPU 201 refers to the device information of MFP 100 to determine whether the operating mode of MFP 100 is a power saving mode (step S51). MFP 100 switches the operating mode between the normal mode and the power saving mode in which less power is consumed than in the normal mode. If the operating mode is the power saving mode, the process proceeds to step S68; otherwise, the process proceeds to step S52. In step S68, CPU 201 sets "non-executable" as a return value indicating that the process cannot be executed, and the process returns to the relay process. In the case where MFP 100 is in the power saving mode, even if the control command is transmitted, the process determined by the control command cannot be executed until the operating mode is switched to the normal mode.

In step S52, CPU 201 determines whether the process specified by the control command is a job executing process of designating execution of a job. If so, the process proceeds to step S53; otherwise, the process proceeds to step S60. In step S53, CPU 201 determines whether the device information indicates that a job is being executed in MFP 100. If so, the process proceeds to step S54; otherwise, the process proceeds to step S55.

In step S54, CPU 201 determines whether the job executing process specified by the control command and the job being executed in MFP 100 specified by the device information can be executed in parallel in MFP 100. If MFP 100 can execute the two processes in parallel, the process proceeds to step S55; otherwise, the process proceeds to step S59. For example, in the case where the process specified by the control command is a process of storing data into HDD 115, if the process being executed in MFP 100 is a process of forming an image in image forming portion 140, it is determined that the processes can be executed in parallel; whereas if the process being executed in MFP 100 is a process of storing a document read by document reading portion 130 into HDD 115, it is determined that the processes cannot be executed in parallel. A table in which processes that can be executed in parallel and processes that cannot be executed in parallel are defined may be acquired from MFP 100 and stored into flash memory 204 in advance.

In step S55, CPU 201 determines whether the job executing process specified by the control command is a data storing process of storing data. If so, the process proceeds to step S56; otherwise, the process proceeds to step S57, with step S56 being skipped. In step S56, CPU 201 refers to the device information of MFP 100 to determine whether HDD 115 in MFP 100 has free space enough to store the data. If so, the process proceeds to step S57; otherwise, the process proceeds to step S59.

In step S57, CPU 201 refers to the device information of MFP 100 to determine whether MFP 100 is in trouble. Here, it is determined whether there has occurred a trouble that makes MFP 100 unable to execute the job executing process specified by the control command. For example, in the case where the job executing process is an image forming process, it is determined that a trouble has occurred when MFP 100 has run out of paper or suffered a paper jam. If MFP 100 is in trouble, the process proceeds to step S59; otherwise, the process proceeds to step S58.

In step S58, CPU 201 sets "executable" as a return value indicating that the process can be executed, and the process proceeds to step S60. On the other hand, in step S59, CPU 201 sets "non-executable" as the return value, and the process proceeds to step S60.

In step S60, CPU 201 determines whether the process specified by the control command is a setting value changing process of changing a setting value. If so, the process proceeds to step S61; otherwise, the process proceeds to step S64. In step S61, CPU 201 determines whether the device information indicates that MFP 100 is being operated by another user. If so, the process proceeds to step S63; otherwise, the process proceeds to step S62. In step S62, CPU 201 sets "executable" as the return value, and the process proceeds to step S64. On the other hand, in step S63, CPU 201 sets "non-executable" as the return value, and the process proceeds to step S64.

In step S64, CPU 201 determines whether the process specified by the control command is a status acquiring process of acquiring the statuses of MFP 100. If so, the process proceeds to step S65; otherwise, the process returns to the relay process. In step S65, CPU 201 determines whether the device information indicates that a job is being executed in MFP 100. If so, the process proceeds to step S67; otherwise, the process proceeds to step S66. In step S66, CPU 201 sets "executable" as the return value, and the process returns to the relay process. On the other hand, in step S67, CPU 201 sets "non-executable" as the return value, and the process returns to the relay process.

FIG. 11 is a flowchart illustrating an exemplary flow of a tunnel connection support process. The tunnel connection support process is carried out by CPU 301 included in management server 300 as CPU 301 executes a program stored in ROM 302, HDD 304, or CD-ROM 309A. Referring to FIG. 11, CPU 301 determines whether an always-on session establishment request has been received (step S101). Specifically, CPU 301 determines whether communication portion 305 has received, from gateway device 200, a request (always-on session establishment request) for establishment of a communication session for constant connection. If CPU 301 determines that the always-on session establishment request has been received, the process proceeds to step S102; otherwise, the process proceeds to step S104.

In step S102, CPU 301 establishes the always-on session with gateway device 200, and the process proceeds to step S103. In step S103, CPU 301 acquires device identification information of any MFP from gateway device 200 via the always-on session. Here, it is assumed that the device identification information of each of MFPs 100, 100A, and 100B is acquired.

In step S104, CPU 301 determines whether a global session establishment request has been received. Specifically, CPU 301 determines whether communication portion 305 has received a global session establishment request from cloud server 400 located outside the firewall. If so, the process proceeds to step S105; otherwise, the process returns to step S101. In step S105, CPU 301 establishes the global session with cloud server 400, and the process proceeds to step S106.

In step S106, CPU 301 transmits a device selecting screen to cloud server 400 via the global session. The device selecting screen is a screen which includes device identification information of gateway device 200 and device identification information of each of MFPs 100, 100A, and 100B, and on which gateway device 200 and one of MFPs 100, 100A, and 100B can be selected.

When cloud server 400 receives the device selecting screen, cloud server 400 can specify the device with which a tunnel connection is to be established. For example, cloud server 400 displays the device selecting screen on a display to cause a user who is operating cloud server 400 to select a device in accordance with the device selecting screen. Cloud server 400 then specifies the device selected by the user as the device with which cloud server 400 is to be connected. Here, it is assumed that the user operating cloud server 400 has selected gateway device 200 and MFP 100. In cloud server 400, when gateway device 200 and MFP 100 are selected as the devices to be connected, cloud server 400 transmits a connection request to management server 300 via the global session. The connection request includes address information of MFP 100 as the address information of the connection source and address information of cloud server 400 as the address information of the connection destination. The address information of MFP 100 includes the device identification information of gateway device 200 and the device identification information of MFP 100. The address information of cloud server 400 is a URL used by MFP 100 to access cloud server 400. The URL includes an address (domain name) of cloud server 400, a Web page identifier, an identifier (job ID) of the job executed by cloud server 400, and a listening port number.

In step S107, CPU 301 determines whether a connection request has been received from cloud server 400. CPU 301 is in a standby mode until a connection request is received (NO in step S107), and once the connection request is received (YES in step S107), the process proceeds to step S108.

In step S108, CPU 301 transmits a tunnel connection request to gateway device 200, via the always-on session established in step S102. The tunnel connection request is a packet in which the connection request has been encapsulated so as to conform to the protocol determined by the always-on session. When gateway device 200 receives the tunnel connection request, gateway device 200 attempts to establish a second communication session with MFP 100, and returns its result in the form of a tunnel connection result.

In step S109, CPU 301 determines whether a tunnel connection result has been received from gateway device 200 via the always-on session. CPU 301 is in a standby mode until a tunnel connection result is received (NO in step S109), and once the tunnel connection result is received (YES in step S109), the process proceeds to step S110. The tunnel connection result includes a tunnel connection result including a mark indicating that the tunnel connection has succeeded and the device information, and a tunnel connection result including a mark indicating that the tunnel connection has failed.

In step S110, CPU 301 stores into HDD 304 the device information included in the tunnel connection result, and the process proceeds to step S111. Specifically, if the tunnel connection result includes the device information, the device information being stored in HDD 304 is updated with the device information included in the tunnel connection result. If the tunnel connection result indicates that the tunnel connection has failed, the device information being stored in HDD 304 is not updated.

In step S111, CPU 301 disconnects the global session established in step S105. The process is then terminated.

Figure 12:
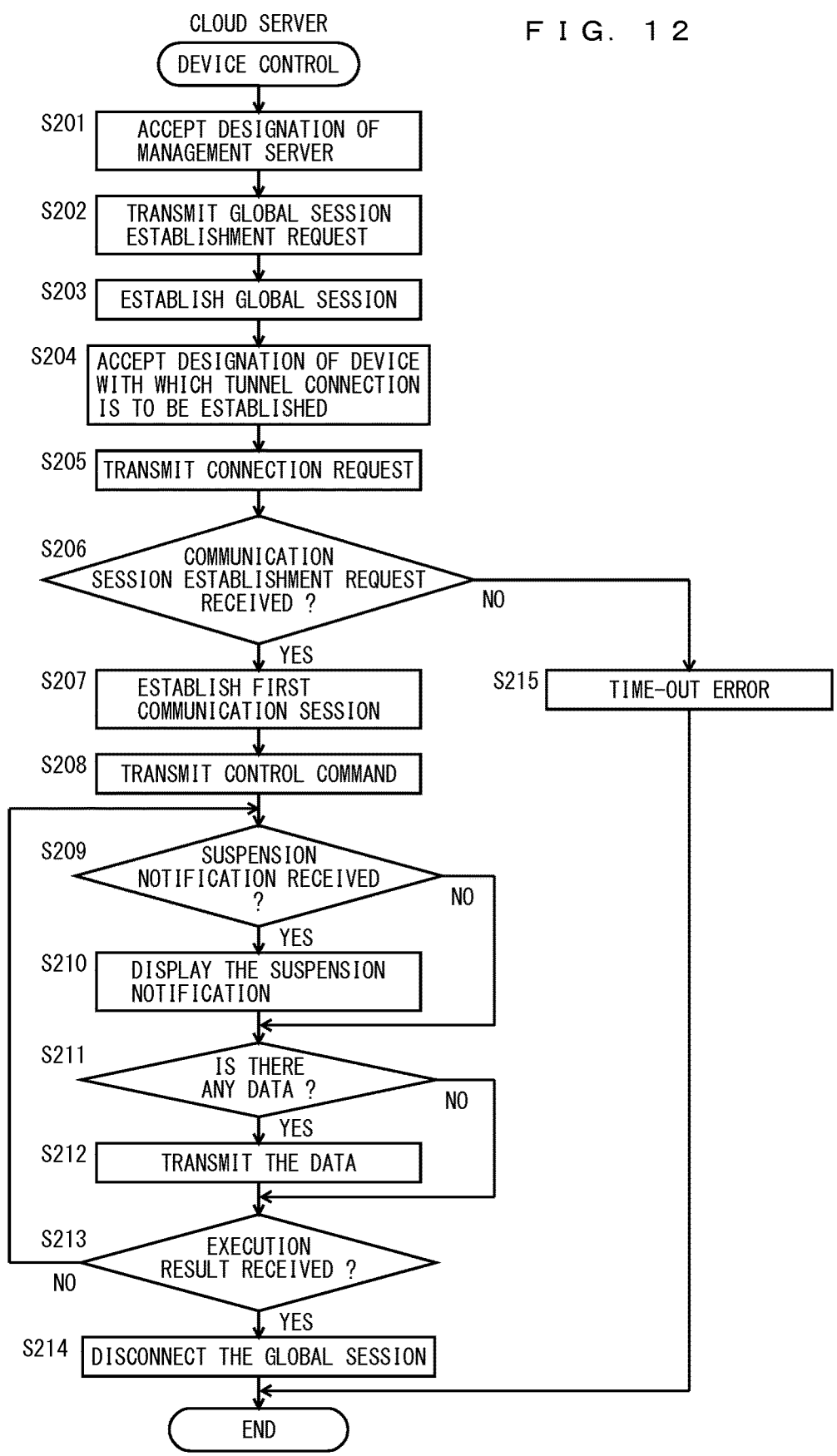
FIG. 12 is a flowchart illustrating an exemplary flow of a device control process.

FIG. 12 is a flowchart illustrating an exemplary flow of a device control process. The device control process is carried out by a CPU included in cloud server 400 as the CPU executes a program for providing a service. Here, among the processes executed by cloud server 400, the process in which cloud server 400 causes MFP 100 to execute a process will be described primarily. Referring to FIG. 12, the CPU included in cloud server 400 accepts designation of a management server (step S201). Specifically, the CPU accepts the global IP address of management server 300 that a user inputs for designating MFP 100.

In the following step S202, the CPU transmits a request for establishment of a global session with management server 300 designated in step S201. In the following step S203, the CPU negotiates with management server 300 to establish the global session as the communication session with management server 300. In this case, management server 300 may request authentication information for authenticating the user registered in management server 300, and it may establish the global session as the communication session on the condition that the authentication has been successful. With this configuration, the users who can access MFPs 100, 100A, and 100B located inside the firewall can be restricted to the users registered in management server 300.

In the following step S204, the CPU accepts designation of a device with which a tunnel connection is to be established. The CPU displays a device selecting screen received from management server 300 via the global session, and specifies the device identification information of the device that has been selected as a target device of the tunnel connection by the user who operates cloud server 400. The device selecting screen is a screen which includes device identification information of gateway device 200 and device identification information of each of MFPs 100, 100A, and 100B, and on which gateway device 200 and one of MFPs 100, 100A, and 100B can be selected. Here, it is assumed that gateway device 200 and MFP 100 have been selected.

In the following step S205, the CPU transmits a connection request to management server 300, via the global session established in step S203. The connection request includes address information of MFP 100 as the address information of the transmission source and a URL as the address information of the transmission destination. The URL includes an address (domain name) of cloud server 400, a Web page identifier, an identifier (job ID) of the job executed by cloud server 400, and a listening port number.

In the following step S206, the CPU determines whether a communication session establishment request has been received. The establishment request here corresponds to the connection request. More specifically, the establishment request is an access to the URL included in the connection request. If the communication session establishment request has been received, the process proceeds to step S207; otherwise, the process proceeds to step S215. In step S215, the CPU notifies the user of a time-out error, and the process is terminated.

In step S207, the CPU establishes a first communication session corresponding to the communication session establishment request, and the process proceeds to step S208.

In step S208, the CPU transmits a control command via the first communication session. While the destination of the control command is gateway device 200, the data transmitted via the first communication session is transmitted to MFP 100 by gateway device 200, via the second communication session established between gateway device 200 and MFP 100, as explained above. Therefore, the control command is actually transmitted to MFP 100.

In the following step S209, the CPU determines whether a suspension notification has been received via the first communication session. If so, the process proceeds to step S210; otherwise, the process proceeds to step S211. In step S210, the CPU displays the received suspension notification on the client terminal connected to cloud server 400, and the process proceeds to step S211. The client terminal connected to cloud server 400 is a PC that the user operating cloud server 400 uses for remotely controlling cloud server 400. Therefore, it is possible to notify the user operating cloud server 400 that the process based on the control command has been suspended in MFP 100, without being executed therein.

In step S211, the CPU determines whether there is data to be transmitted to MFP 100. For example, in the case where the control command indicates a process of updating firmware, there is an updating program as the data. In the case where the control command indicates a process of storing data, there is the data to be stored. If there is such data, the process proceeds to step S212; otherwise, the process proceeds to step S213. In step S212, the CPU transmits the data via the first communication session, and the process proceeds to step S213. While the destination of the data is gateway device 200, as with the control command, the data is actually transmitted to MFP 100.

In step S213, the CPU determines whether an execution result has been received via the first communication session. If so, the CPU displays the received execution result on the client terminal connected to cloud server 400, and the process proceeds to step S214; otherwise, the process returns to step S209. This makes it possible to notify the user operating cloud server 400 of the result of the process that has been executed in MFP 100 based on the control command. In step S214, the CPU disconnects the global session established in step S203. The process is then terminated.

As described above, gateway device 200 according to the present embodiment functions as a relay device which is disposed inside the firewall and which relays a communication between MFP 100 disposed inside the firewall and cloud server 400 located outside the firewall. In relaying the communication between cloud server 400 and MFP 100, gateway device 200 acquires device information from MFP 100 and, on the basis of the acquired device information, determines whether MFP 100 is able to execute a process that is specified by a control command transmitted from cloud server 400 destined for MFP 100. When gateway device 200 determines that MFP 100 is unable to execute the process, gateway device 200 temporarily stores the control command. Thereafter, when gateway device 200 determines, on the basis of the device information acquired from MFP 100 after the control command has been temporarily stored, that MFP 100 is able to execute the process, gateway device 200 transmits the temporarily stored control command to MFP 100, on behalf of cloud server 400. With this configuration, when MFP 100 is unable to execute the process specified by the control command, gateway device 200 refrains from transmitting the control command. This eliminates the need for MFP 100 to perform a process corresponding to the control command, which suppresses an increase of the load. Further, cloud server 400 can transmit the control command, irrespective of whether MFP 100 is able to execute the process or not. Cloud server 400 does not need to perform a process for determining the statuses of MFP 100, which suppresses an increase of the load. As a result, it is possible to improve the efficiency of the communication between cloud server 400 and MFP 100 via the firewall.

In the case where gateway device 200 temporarily stores the control command, gateway device 200 notifies cloud server 400 that the control command has been put on hold, on behalf of MFP 100. As such, it is possible to notify the user operating cloud server 400 that the process has not been executed by MFP 100.

Further, when gateway device 200 receives an execution result transmitted from MFP 100, gateway device 200 notifies cloud server 400 of the execution result, on behalf of MFP 100. As such, it is possible to notify the user operating cloud server 400 that the process has been completed by MFP 100.

At a stage before gateway device 200 stores the control command, gateway device 200 determines the executability on the basis of the device information acquired from MFP 100 before receiving the control command. Therefore, gateway device 200 does not need to acquire the device information from MFP 100 after the control command is received. This can reduce the load on MFP100 and can also reduce the time that elapses before the executability is determined.

Further, in the case where gateway device 200 determines that MFP 100 is unable to execute the process on the basis of the device information of MFP 100 at the time point when the control command was received, if the control command is a command to store data, gateway device 200 receives, on behalf of MFP 100, the data transmitted from cloud server 400, and stores the received data into flash memory 204 or into MFP 100A or 100B, other than MFP 100. Further, after gateway device 200 transmits the control command to MFP 100, gateway device 200 acquires the data from flash memory 204 or MFP 100A or 100B, and transmits, on behalf of cloud server 400, the acquired data to MFP 100. As cloud server 400 transmits the data to gateway device 200, cloud server 400 can transmit the data immediately after it has transmitted the control command, with no waiting time. Further, as the data transmitted from cloud server 400 is stored in flash memory 204 or MFP 100A or 100B, the data is prevented from being lost before being transmitted to MFP 100; the data can be properly transmitted to MFP 100.

Further, gateway device 200 establishes an always-on session with management server 300 located outside the firewall, and receives, via the always-on session, a connection request that management server 300 receives from cloud server 400. Gateway device 200 establishes the first communication session using address information of cloud server 400 as the connection destination, which is included in the received connection request. Gateway device 200 also establishes the second communication session with MFP 100 which is specified by address information of MFP 100 as the connection source, which is included in the received connection request. This enables a communication between cloud server 400 and MFP 100 as the control target device, via the firewall.

MFP 100 includes gateway device 200, and MFP 100 is the control target device to be controlled by cloud server 400.

Further, MFP 100 is an image forming apparatus including gateway device 200, and gateway device 200 establishes the second communication session with an MFP which is selected by the user operating cloud server 400 from among MFP 100 and other MFPs 100A and 100B disposed inside the firewall, and relays a communication between cloud server 400 and the selected MFP. Therefore, it is possible to improve the efficiency of the communication between cloud server 400 and one of MFPs 100, 100A, and 100B disposed inside the firewall.

While gateway device 200 has been described as an example of the relay device in the above embodiment, the present invention can of course be specified as a relay method for causing gateway device 200 to perform the relay process shown in FIGS. 7 to 10, or as a relay program for causing CPU 201 controlling gateway device 200 to perform the relay method.

Although the present invention has been described and illustrated in detail, it is clearly understood that the same is by way of illustration and example only and is not to be taken by way of limitation, the spirit and scope of the present invention being limited only by the terms of the appended claims.

<Appendix>

(1) The relay device according to claim 4, wherein in the case where a prescribed time has passed from when the device information was acquired by said device information acquiring portion at a stage before said control command is stored by said suspending portion, said executability determining portion determines the executability on the basis of the device information that is acquired by said device information acquiring portion after said control command has been received.

What is claimed is:

1. A relay device disposed inside a firewall and connected to a control target device disposed inside the firewall, the relay device comprising:
   a hardware processor configured to:
      establish a first communication session with a cloud server located outside the firewall;
      establish a second communication session with said control target device;
      acquire device information about said control target device;
      in response to reception of a control command from said cloud server via said first communication session, determine whether said control target device is able to execute a process specified by said control command based on the acquired device information prior to transmitting said control command to said control target device;
      when the control command is determined to be non-executable based on the acquired device information, suspend a transmission of said control command to said control target device and store the control command before sending said control command to said control target device so that said control target device does not begin executing said control command;
      after the transmission of said control command to said control target device is suspended and stored, continue to intermittently acquire said device information about said control target device at prescribed time intervals; and
      when the control command is determined to be executable based on the device information acquired in said intermittent prescribed time intervals after said control command was suspended, transmit the suspended control command to said control target device, on behalf of said cloud server, via said second communication session.

2. The relay device according to claim 1, wherein the hardware processor is further configured:
   in the case where said control command is suspended, to notify said cloud server that said control command has been suspended, on behalf of said control target device, via said first communication session.

3. The relay device according to claim 1, wherein the hardware processor is further configured:
   to receive, via said second communication session, an execution result that said control target device transmits in response to transmission of said control command; and
   in response to reception of said execution result, to notify said cloud server of said received execution result, on behalf of said control target device, via said first communication session.

4. The relay device according to claim 1, wherein at a stage before said control command is suspended, the hardware processor determines executability of the control target device on the basis of the device information that is acquired before said control command is received.

5. The relay device according to claim 1, wherein the hardware processor is further configured:
   in the case where the control command is determined to be non-executable on the basis of the device information acquired at a time point when said control command was received via said first communication session and in the case where said control command is a command to store data, to receive data transmitted from said cloud server, on behalf of said control target device, via said first communication session;
   to store said received data into a storage device which is different from said control target device and is disposed inside the firewall; and
   after said control command has been transmitted to said control target device, to acquire said data from said storage device and to transmit said acquired data to said control target device, on behalf of said cloud server, via said second communication session.

6. The relay device according to claim 1, wherein the hardware processor is further configured:
   to establish an always-on session with a management server located outside the firewall;
   to receive a connection request from said management server via said always-on session, the connection request being received by said management server from said cloud server and including address information of a connection source and address information of a connection destination; wherein
   the hardware processor establishes said first communication session using the address information of said connection destination included in said received connection request, and
   the hardware processor establishes said second communication session with said control target device which is specified by the address information of said connection source included in said received connection request.

7. An image forming apparatus comprising the relay device according to claim 1, wherein said image forming apparatus is said control target device.

8. An image forming apparatus comprising the relay device according to claim 1, wherein said control target device is selected by a user operating the cloud server, from among said image forming apparatus and another device disposed inside the firewall.

9. A relay method performed by a relay device disposed inside a firewall and connected to a control target device disposed inside the firewall, the method comprising:
   a first session establishing step of establishing a first communication session with a cloud server located outside the firewall;

a second session establishing step of establishing a second communication session with said control target device;

a device information acquiring step of acquiring device information about said control target device;

an executability determining step of determining, in response to reception of a control command from said cloud server via said first communication session, whether said control target device is able to execute a process specified by said control command based on the acquired device information prior to transmitting said control command to said control target device;

when the control command is determined to be non-executable based on the acquired device information, a suspending step of suspending a transmission of said control command to said control target device and storing said control command before sending said control command to said control target device so that said control target device does not begin executing said control command;

after the suspending step in which transmission of said control command to said control target device is suspended and stored, continuously intermittently acquiring said device information about said control target device at prescribed time intervals; and a proxy transmitting step of transmitting the suspended control command to said control target device, on behalf of said cloud server, via said second communication session when the control command is determined to be executable based on the device information acquired in said intermittent prescribed time intervals after the control command was suspended.

10. The relay method according to claim 9, further comprising a first notification step of, in the case where said control command is suspended, notifying said cloud server that said control command has been suspended, on behalf of said control target device, via said first communication session.

11. The relay method according to claim 9, further comprising:

an execution result receiving step of receiving, via said second communication session, an execution result that said control target device transmits in response to transmission of said control command in said proxy transmitting step; and a second notification step of, in response to reception of said execution result in said execution result receiving step, notifying said cloud server of said received execution result, on behalf of said control target device, via said first communication session.

12. The relay method according to claim 9, wherein said executability determining step includes a step of, at a stage before said control command is suspended, determining the executability on the basis of the device information that is acquired in said device information acquiring step before said control command is received.

13. The relay method according to claim 9, further comprising:

a proxy receiving step of, when the control command is determined to be non-executable in said executability determining step based on the device information acquired in said device information acquiring step at a time point when said control command was received via said first communication session and when said control command is a command to store data, receiving data transmitted from said cloud server, on behalf of said control target device, via said first communication session, said suspending step including a step of storing said received data into a storage device which is different from said control target device and is disposed inside the firewall, and a proxy data transmitting step of, after said control command has been transmitted to said control target device in said proxy transmitting step, acquiring said data from said storage device and transmitting said acquired data to said control target device, on behalf of said cloud server, via said second communication session.

14. The relay method according to claim 9, further comprising:

an always-on session establishing step of establishing an always-on session with a management server located outside the firewall; and a connection request receiving step of receiving a connection request from said management server via said always-on session, the connection request being received by said management server from said cloud server and including address information of a connection source and address information of a connection destination; wherein said first session establishing step includes a step of establishing said first communication session using the address information of said connection destination included in said received connection request, and said second session establishing step includes a step of establishing said second communication session with said control target device which is specified by the address information of said connection source included in said received connection request.

15. The relay method according to claim 9, wherein said relay device which performs said relay method is included in an image forming apparatus, and said image forming apparatus is said control target device.

16. The relay method according to claim 9, wherein said relay device which performs said relay method is included in an image forming apparatus, and said control target device is selected by a user operating the cloud server from among said image forming apparatus and another device disposed inside the firewall.

17. A non-transitory computer-readable recording medium encoded with a relay program executed by a computer controlling a relay device, the relay device being disposed inside a firewall and connected to a control target device disposed inside the firewall, the program causing said computer to perform:

a first session establishing step of establishing a first communication session with a cloud server located outside the firewall;

a second session establishing step of establishing a second communication session with said control target device;

a device information acquiring step of acquiring device information about said control target device;

an executability determining step of determining, in response to reception of a control command from said cloud server via said first communication session, whether said control target device is able to execute a process specified by said control command based on the acquired device information prior to transmitting said control command to said control target device;

when the control command is determined to be non-executable based on the acquired device information, a suspending step of suspending a transmission of said control command to said control target device and storing said control command before sending said control command to said control target device so that said control target device does not begin executing said control command;

after the suspending step in which transmission of said control command to said control target device is suspended and stored, continuously intermittently acquiring said device information about said control target device at prescribed time intervals; and a proxy transmitting step of transmitting the suspended control command to said control target device, on behalf of said cloud server, via said second communication session when the control command is determined to be executable based on the device information acquired in said intermittent prescribed time intervals after the control command was suspended.

18. The non-transitory computer-readable recording medium encoded with the relay program according to claim 17, causing said computer to further perform a first notification step of, in the case where said control command is suspended, notifying said cloud server that said control command has been suspended, on behalf of said control target device, via said first communication session.

19. The non-transitory computer-readable recording medium encoded with the relay program according to claim 17, causing said computer to further perform:
an execution result receiving step of receiving, via said second communication session, an execution result that said control target device transmits in response to transmission of said control command in said proxy transmitting step; and
a second notification step of, in response to reception of said execution result in said execution result receiving step, notifying said cloud server of said received execution result, on behalf of said control target device, via said first communication session.

20. The non-transitory computer-readable recording medium encoded with the relay program according to claim 17, wherein said executability determining step includes a step of, at a stage before said control command is suspended, determining the executability based on the device information that is acquired in said device information acquiring step before said control command is received.

21. The non-transitory computer-readable recording medium encoded with the relay program according to claim 17, causing said computer to further perform:
a proxy receiving step of, when the control command is determined to be non-executable in said executability determining step based on the device information acquired in said device information acquiring step at a time point when said control command was received via said first communication session and when said control command is a command to store data, receiving data transmitted from said cloud server, on behalf of said control target device, via said first communication session,
said suspending step including a step of storing said received data into a storage device which is different from said control target device and is disposed inside the firewall, and
a proxy data transmitting step of, after said control command has been transmitted to said control target device in said proxy transmitting step, acquiring said data from said storage device and transmitting said acquired data to said control target device, on behalf of said cloud server, via said second communication session.

22. The non-transitory computer-readable recording medium encoded with the relay program according to claim 17, causing said computer to further perform:
an always-on session establishing step of establishing an always-on session with a management server located outside the firewall; and
a connection request receiving step of receiving a connection request from said management server via said always-on session, the connection request being received by said management server from said cloud server and including address information of a connection source and address information of a connection destination; wherein
said first session establishing step includes a step of establishing said first communication session using the address information of said connection destination included in said received connection request, and
said second session establishing step includes a step of establishing said second communication session with said control target device which is specified by the address information of said connection source included in said received connection request.

23. The non-transitory computer-readable recording medium encoded with the relay program according to claim 17, wherein
the relay device which is controlled by the computer executing said relay program is included in an image forming apparatus, and
said image forming apparatus is said control target device.

24. The non-transitory computer-readable recording medium encoded with the relay program according to claim 17, wherein
the relay device which is controlled by the computer executing said relay program is included in an image forming apparatus, and
said control target device is selected by a user operating the cloud server from among said image forming apparatus and another device disposed inside the firewall.

* * * * *